United States Patent
Olsson et al.

(10) Patent No.: US 9,372,117 B2
(45) Date of Patent: Jun. 21, 2016

(54) OPTICAL GROUND TRACKING APPARATUS, SYSTEMS, AND METHODS

(71) Applicants: Mark S. Olsson, La Jolla, CA (US); Eric M. Chapman, Santee, CA (US); Ray Merewhether, La Jolla, CA (US); Sequoyah Aldridge, San Diego, CA (US)

(72) Inventors: Mark S. Olsson, La Jolla, CA (US); Eric M. Chapman, Santee, CA (US); Ray Merewhether, La Jolla, CA (US); Sequoyah Aldridge, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 14/584,996

(22) Filed: Dec. 29, 2014

(65) Prior Publication Data

US 2015/0204652 A1 Jul. 23, 2015

Related U.S. Application Data

(63) Continuation of application No. 13/766,670, filed on Feb. 13, 2013, now Pat. No. 9,341,740.

(60) Provisional application No. 61/615,810, filed on Mar. 26, 2012, provisional application No. 61/618,746, filed on Mar. 31, 2012, provisional application No. 61/679,672, filed on Aug. 3, 2012, provisional application No. 61/619,327, filed on Apr. 2, 2012, provisional application No. 61/764,474, filed on Feb. 13, 2013, provisional application No. 61/598,312, filed on Feb. 13, 2012.

(51) Int. Cl.
| | | |
|---|---|---|
| G01N 21/00 | (2006.01) | |
| G01J 3/46 | (2006.01) | |
| G01S 17/02 | (2006.01) | |
| G01S 17/06 | (2006.01) | |
| G01S 17/08 | (2006.01) | |
| G01S 17/88 | (2006.01) | |
| G01S 17/89 | (2006.01) | |
| G01V 3/10 | (2006.01) | |
| G01V 3/15 | (2006.01) | |

(52) U.S. Cl.
CPC ................ G01J 3/46 (2013.01); G01S 17/023 (2013.01); G01S 17/06 (2013.01); G01S 17/08 (2013.01); G01S 17/88 (2013.01); G01S 17/89 (2013.01); *G01J 2003/467* (2013.01); *G01V 3/10* (2013.01); *G01V 3/15* (2013.01)

(58) Field of Classification Search
CPC ... H01J 37/32935; G01N 21/64; G01N 21/68; G01N 2015/1037; G01J 3/02
USPC .......................................................... 356/72
See application file for complete search history.

(56) References Cited

U.S. PATENT DOCUMENTS 3,696,510 A   10/1972 Evans, Jr.
5,174,038 A   12/1992 Neyens et al.
(Continued)

FOREIGN PATENT DOCUMENTS

WO PCT/US2014/016283   8/2014

*Primary Examiner* — Tarifur Chowdhury
*Assistant Examiner* — MD M Rahman
(74) *Attorney, Agent, or Firm* — Steven C. Tietsworth, Esq.

(57) ABSTRACT

Optical ground tracking apparatus for use with buried object locators or other instruments or devices are disclosed. In one embodiment, a method for tracking movement of a buried utility locator over a surface includes generating an output light, providing the output light to the surface, receiving a portion of the output light that is reflected from the surface, and generating information associated with a user-applied movement of the locator over the surface based at least in part on the received reflected portion of the output light.

21 Claims, 29 Drawing Sheets

(56) References Cited

U.S. PATENT DOCUMENTS

| | | |
|---|---|---|
| 5,410,405 A | 4/1995 | Schultz et al. |
| 5,517,419 A | 5/1996 | Lanckton et al. |
| 6,252,538 B1 | 6/2001 | Chignell |
| 6,700,526 B2 | 3/2004 | Witten |
| 6,725,553 B2 | 4/2004 | Airey et al. |
| 6,917,893 B2 | 7/2005 | Dietsch et al. |
| 7,111,412 B2 | 9/2006 | Huang |
| 7,283,426 B2 | 10/2007 | Grasso |
| 7,336,078 B1 | 2/2008 | Merewether et al. |
| 7,372,247 B1 | 5/2008 | Giusti et al. |
| 7,518,374 B1 | 4/2009 | Olsson et al. |
| 7,536,805 B1 | 5/2009 | Tang |
| 7,755,360 B1 | 7/2010 | Martin |
| 7,933,002 B2 | 4/2011 | Halldorsson |
| 2002/0105469 A1 | 8/2002 | Albats, Jr. et al. |
| 2003/0112170 A1* | 6/2003 | Doerksen ............... G01S 5/16 342/22 |
| 2003/0184300 A1* | 10/2003 | Bigelow ............... G01V 3/15 324/326 |
| 2003/0189428 A1* | 10/2003 | Hansen ............... G01V 3/15 324/329 |
| 2003/0189708 A1* | 10/2003 | Chang ............... G01V 1/001 356/450 |
| 2004/0070399 A1* | 4/2004 | Olsson ............... G01V 3/15 324/326 |
| 2004/0140810 A1* | 7/2004 | Mercer ............ E21B 47/02216 324/326 |
| 2006/0055584 A1* | 3/2006 | Waite ............... G01S 13/86 342/22 |
| 2006/0091888 A1* | 5/2006 | Holman ............... G01V 3/15 324/326 |
| 2006/0178849 A1 | 8/2006 | Maier et al. |
| 2009/0140887 A1 | 6/2009 | Breed et al. |
| 2011/0001633 A1 | 1/2011 | Lam et al. |
| 2011/0006772 A1* | 1/2011 | Olsson ............... G01V 3/15 324/326 |

\* cited by examiner

OPTICAL GROUND TRACKING APPARATUS, SYSTEMS, AND METHODS

CROSS-REFERENCE TO RELATED APPLICATIONS

This application is a continuation of and claims priority to U.S. Utility patent application Ser. No. 13/766,670, filed on Feb. 13, 2013, entitled OPTICAL GROUND TRACKING APPARATUS, SYSTEMS, AND METHODS, which claims priority under 35 U.S.C. §119(e) to U.S. Provisional Patent Application Ser. No. 61/598,312, filed on Feb. 13, 2012, entitled OPTICAL GROUND TRACKING LOCATOR DEVICES AND METHODS, to U.S. Provisional Patent Application Ser. No. 61/615,810, filed on Mar. 26, 2012, entitled GROUND-TRACKING SYSTEMS AND APPARATUS, to U.S. Provisional Patent Application Ser. No. 61/618,746, filed on Mar. 31, 2012, entitled DUAL ANTENNA SYSTEMS WITH VARIBLE POLARIZATION, and to U.S. Provisional Patent Application Ser. No. 61/679,672, filed Aug. 3, 2012, entitled OPTICAL GROUND TRACKING APPARATUS, SYSTEMS & METHODS. The contents of each of these applications are incorporated by reference herein in their entirety for all purposes. These applications may be denoted herein as the "priority applications" for brevity.

FIELD

This disclosure relates generally to apparatus, systems, and methods for locating hidden or buried objects. More specifically, but not exclusively, the disclosure relates to apparatus, systems, and methods for over-ground tracking of the location or movement of devices such as tools, instruments, or inspection equipment, such buried object locators or other devices, and generating mapping information for tracked locations and associated signals detected.

BACKGROUND

With the evolution of more complex infrastructures requiring enhancement, replacement, and expansion in all areas of human occupation, and in particular high-density areas such as cities and suburbs, the ability to accurately map the location of buried conduits, wires and pipelines of various sizes and kinds becomes more pressing, as does the need to document actual as-built underground installations before they are covered so that they can be precisely located at a later date.

Worker safety and project economic concerns also require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects." As used herein, the term "buried objects" includes objects located inside walls, between floors in multi-story buildings or cast into concrete slabs, for example, as well as objects disposed below the surface of the ground.

The unintended destruction of power and data cables may seriously disrupt the comfort and convenience of residents and bring huge financial costs to business. Therefore human-portable locators have been developed that sense electromagnetic emitted signals to thereby locate buried utilities such as pipes and cables. If the buried conductors carry their own electrical signal, they can be traced by detecting the emitted signals at their appropriate frequency. Signals with a known frequency are also applied to pipes and cables via a transmitter to enhance the ease and accuracy of the line tracing.

Portable utility locators or buried object locator typically carry one or more antennas that are used to detect the electromagnetic signals, and typically magnetic field signals, emitted by buried pipes and cables, as well as sondes that have been inserted into pipes. The accuracy of portable utility locators is limited by the sensitivity and the configuration of their antennas. Moreover, precise locating of the position of a locator on the surface of the earth—as would be needed, for example, in order to build an accurate digital map of the locating results—has been problematic because of imprecise positioning technology and an inability to track the position of a locator relative to the ground itself.

SUMMARY

This disclosure relates generally to ground tracking apparatus, systems, and methods. The apparatus, methods, and systems described herein may be used with a wide variety of tools, instruments, equipment, or other devices that move or are moved over the ground or other surfaces.

For example, in one aspect, the disclosure relates to a locator device for detecting a hidden or buried object. The locator device may include, for example, a buried object detection module for determining the relative position and orientation of a buried object based on magnetic field signals emitted from the buried object and/or an estimate of the depth of the buried object. The locator device may further include an optical ground tracking apparatus for tracking movement of the locator. The ground tracking apparatus may include light generation and capture assemblies including one or more of an output light snoot assembly, an input light snoot assembly, an output light generator assembly, and an input light sensor assembly. The locator may further include one or more processing elements. The processing elements may be configured to receive one or more signals from the input light sensor assembly, process the received one or more signals to determine position and/or motion information, and generate, based at least in part on the received signals, position, location, and/or tracking information.

In another aspect, the disclosure relates to a buried object locator. The buried object locator may include, for example, a buried object locator module configured to sense a buried object and generate buried object information corresponding with the position and orientation of the buried object The buried object locator module may include one or more processing elements and associated sensors or antennas to receive magnetic field signals emitted from the buried object and determine the buried object information based at least in part on the received magnetic field signals. The buried object locator may further include a surface tracking module. The surface tracking module may include one or more processing elements. The surface tracking module may be configured to detect light reflected from a tracking surface, sense or compute a motion of the buried object locator relative to the tracking surface, based at least in part on analysis of light patterns associated with the surface, and generate motion information corresponding with the sensed motion. The buried object locator may further include an integration module configured to associate the buried object information with corresponding motion information and store the associated information in a memory. The integration module may include one or more processing elements.

In another aspect, the disclosure relates to a method of tracking movement of a device over a surface. The method may include, for example, generating an output light through an output light snoot assembly, providing the output light to the surface, receiving reflected output light through an input light snoot assembly, and generating information associated with the device movement based at least in part on the received reflected light.

In another aspect, the disclosure relates to buried object locating system which may include, for example, one or more light emitting elements, such as light-emitting diodes (LEDs) or other light sources, ambient light, and the like. Embodiments may use light sources and ambient light alone in some embodiments and in combination in some embodiments. A plurality of color sensors may be used for capturing and filtering reflections from such types of emitted light as reflected from the ground surface.

In another aspect the present disclosure relates to a method of capturing information describing light from a ground surface reflection of emitted light pulses as digital data and incorporating such data into a mapping process.

In another aspect, the disclosure relates to a method for use in a buried object locator system. The method may include, for example, generating, from a locating instrument, infrared light whose reflections may be used to compute the precise distance of the locating instrument above ground (e.g.—triangulation). For example, an infrared source may bounce off the ground, hit a lens, and may be captured by a CCD. The method may further include using such measured distance to refine the calculated depth of detected buried objects as computed by the locating instrument.

In another aspect, the disclosure relates to a locating device equipped with light-sensing and/or color-sensing arrays which, in combination with other locational sensors, such as inertial or gyroscopic sensors, may enable the device to operate as a line-scan camera and optical ground-tracking device, capturing situational data for integration with maps and area images.

In another aspect, the present disclosure relates to a locating receiver which may include a processor or processors for computing surface velocity vectors over ground of the receiver by correlation of reflected light received by a plurality of color sensors, and may also include memory devices capable of storing and relaying such information in digital form.

In another aspect of the present location, the light source may be a coherent laser light whose reflections from a surface are detected by a sensor from whose input a laser-speckle pattern analysis may be used to deduce the range and motion of the instrument relative to the ground.

In another aspect, the disclosure relates to means for implementing the above-described methods and/or system or device functions, in whole or in part.

In another aspect, the disclosure relates to apparatus and systems for implementing the above-described methods and/or system or device functions, in whole or in part.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
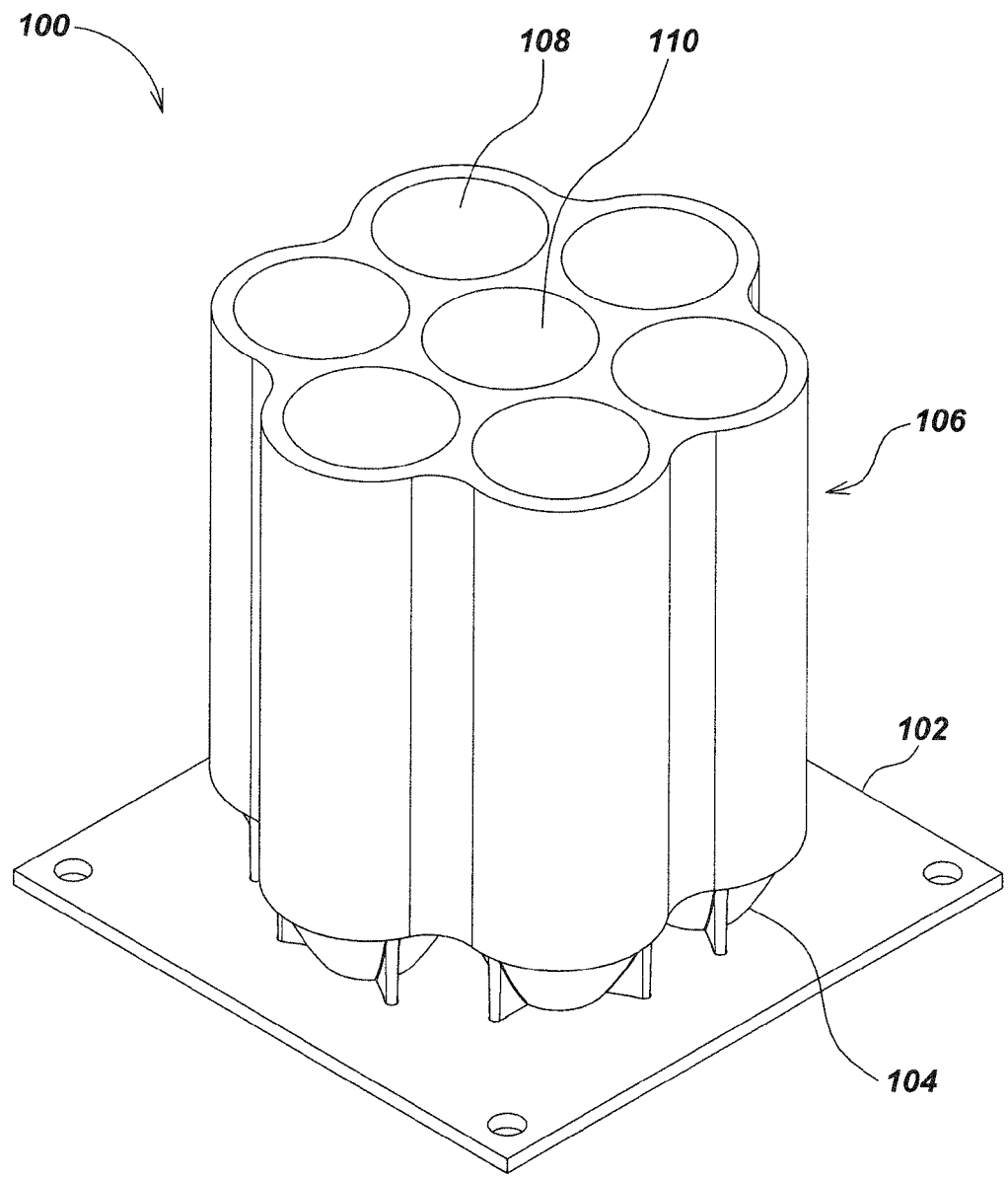
FIG. 1 is an isometric view of an embodiment of a color sensing assembly.

The present disclosure relates generally to apparatus, systems, and methods for locating hidden or buried objects and tracking location and/or movement during location or other operations. More specifically, but not exclusively, the disclosure relates to buried object locating transmitters for generating and simultaneously transmitting a plurality of current signals across buried or hidden objects, as well as corresponding receivers and processing devices for receiving signals generated from the buried or hidden objects and processing the signals to generate information for user output and/or storage, along with tracking apparatus and methods for tracking position and/or movement over the ground or other surface, and mapping apparatus and methods for generating mapping information associated with the tracking and locator signals.

When locating hidden or buried objects or using other devices that are moving or moved over the ground or other surfaces, the ability of the operator to store and map detections made during a locate or other operation may be important to efficient operation. Thus, locating devices or other devices capable of coordinating GPS signals or local terrain characteristics with the signals received from buried objects allow operators to more precisely fix the location of those objects on maps or overlaid onto bird's-eye or satellite images, for example, and to more readily recover the history of past locates in a given location. Precisely fixing the physical location of a locator device at as given moment in time can depend on GPS or wireless signals, the inputs from on-board inertial sensors, and the recording of ground characteristics and terrain features in the immediate vicinity by means of cameras or other optical devices. In some embodiments, locators may include GPS modules with one or more antennas for generating location data and/or other GPS data such as time information, motion information, altitude information, and/or other available GPS information. In some locator embodiments, multiple GPS antenna configurations, which may be spaced apart, such as described in co-assigned U.S. Provisional Patent Application Ser. No. 61/618,746, filed on Mar. 31, 2012, entitled DUAL ANTENNA SYSTEMS WITH VARIBLE POLARIZATION, which is incorporated by reference herein, may be used. In various embodiments, magnetic field antennas and associated processing and display functions, such as described in the "incorporated applications" or other magnetic field sensing, processing and display elements as are known or developed in the art may be used in conjunction with the tracking aspects and functions described herein.

For example, in one aspect, the present disclosure relates to a utility locating device able to track location over the ground while locating and capturing optical characteristics of the ground surface (such as color and texture) as data for use in integrating the locator's electromagnetic detections with terrestrial mapping satellite images, blueprints, and/or photographs.

In another aspect, a locator may be configured to detect the variable reflectivity or coloration of ground surface, including markings laid on the ground and occasional encountered objects lying on the ground. To accomplish this, a highly directional LED light source may be optionally combined with a near-range light or color sensor array.

In another aspect, a formed snoot may be coupled with a color sensor array in order to improve the directionality of returned light to the sensor array.

In another aspect, the disclosure relates to a locator device for detecting a hidden or buried object. The locator device may include, for example, a buried object detection module for determining the relative position and orientation of a buried object based on magnetic field signals emitted from the buried object and/or an estimate of the depth of the buried object. The locator device may further include an optical ground tracking apparatus for tracking movement of the locator. The ground tracking apparatus may include light generation and capture assemblies including one or more of an output light snoot assembly, an input light snoot assembly, an output light generator assembly, and an input light sensor assembly. The locator may further include one or more processing elements. The processing elements may be configured to receive one or more signals from the input light sensor assembly, process the received one or more signals to determine position and/or motion information, and generate, based at least in part on the received signals, position, location, and/or tracking information.

The locator device may further include, for example, a distance measurement module. The distance measurement module may be configured to measure a distance between a reference position on a device coupled to the optical ground tracking sensor apparatus and the ground and generate distance information. The position, location and/or tracking information may be further based on the distance information. The processing element may be further configured to selectively control the generation of a light output from the output light generator assembly. The controlled light output may be pulsed or cycled light, and/or dots or other targets or markers, and/or other controlled light patterns or sequences.

The output light snoot assembly may, for example, include a single tube or snoot. The input light snoot assembly may include six or more tubes or snoots. The input light snoot assembly may include an aperture ring. The output light snoot assembly may include an optical coating or other surface configuration or optics to enhance light transmission. The output light snoot assembly may have a surface polish to enhance light transmission.

The output light generator assembly may, for example, include one or more LEDs and/or one or more laser or other visible, infrared, ultraviolet, or other light generation devices. The output light generator assembly may include one or more reflectors. The reflector may be a three dimensional (3D) parabolic reflector. The LED may be positioned at the focus point of the reflector.

The input light sensor assembly may, for example, include a sensor or detector element. The sensor or detector element may be a digital color sensor. The sensor or detector element may be a CCD or CMOS optical sensor array or imaging device. The input light sensor assembly may further include one or more reflectors. The reflectors may be three dimensional (3D) parabolic reflectors. The sensor or detector may be positioned at the focus point of the reflector.

In another aspect, the disclosure relates to a buried object locator. The buried object locator may include, for example, a buried object locator module configured to sense a buried object and generate buried object information corresponding with the position and orientation of the buried object The buried object locator module may include one or more processing elements and associated sensors or antennas to receive magnetic field signals emitted from the buried object and determine the buried object information based at least in part on the received magnetic field signals. The buried object locator may further include a surface tracking module. The surface tracking module may include one or more processing elements. The surface tracking module may be configured to detect light reflected from a tracking surface, sense or compute a motion of the buried object locator relative to the tracking surface, based at least in part on analysis of light patterns associated with the surface, and generate motion information corresponding with the sensed motion. The buried object locator may further include an integration module configured to associate the buried object information with corresponding motion information and store the associated information in a memory. The integration module may include one or more processing elements.

The buried object locator may further include, for example, a light generation module to generate a tracking light pulse or beam and transmit the tracking light pulse or beam to a tracking surface. The light generation module may include one or more processing elements and one or more light generation elements, such as lighting devices and associated electronic control circuits. The buried object locator may further include a mapping module to generate a map of the buried object relative to the surface based at least in part on the buried object information and the motion information. The mapping module may include one or more processing elements and associated elements, such as memory storing mapping data or information. The buried object locator may further include a display module to provide a visual display of the buried object information and corresponding motion information. The display module may include one or more display devices and associated display generation and control circuits. The display devices may be user input/output devices, such as LCD or other display elements, touch screens, switches or other control elements, and the like. The buried object locator may further include a distance measurement module to measure a distance between a reference position on the locator and the ground and generate distance information. The distance measurement module may include one or more processing elements and associated ultrasonic, optical, electromagnetic, or other distance measuring elements and associated circuits. The motion information may be further based on the distance information.

In another aspect, the disclosure relates to a method of tracking movement of a device over a surface. The method may include, for example, generating an output light through an output light snoot assembly, providing the output light to the surface, receiving reflected output light through an input light snoot assembly, and generating information associated with the device movement based at least in part on the received reflected light.

The information associated with device movement may, for example, be location or tracking information. The tracking information may be generated in a processing element configured to receive one or more signals from the input light sensor assembly and generate, based at least in part on the received signals, the location or tracking information. The method may further include controlling, from the processing element, the generated output light. The output light may be generated based at least in part on previously received reflected light.

In another aspect, the disclosure relates to a buried object receiver. The receiver may, for example, be equipped with sensors designed to receive reflected light from a ground surface over which the locator receiver is held and may be equipped with analog-to-digital circuitry enabling the values of received light to be stored as digital data. The receiver may also be equipped with sensors designed to emit infrared frequency light and to capture reflections of such light from a ground surface and further to calculate the distance of the locator from the ground. In another aspect, parabolic or spherical mirrors and lenses may be used to focus reflected light toward light sensors.

In another aspect, the receiver may be equipped with a laser emitter and a detector which receives reflections of the emitted coherent light from a ground surface. The speckle pattern of the reflections of coherent light may be analyzed to determine the direction and velocity of movement relative to the ground surface.

In another aspect, the disclosure relates to one or more computer readable media including non-transitory instructions for causing a computer to perform the above-described methods or functions, in whole or in part.

In another aspect, the disclosure relates to apparatus and systems for implementing the above-described methods or functions, in whole or in part.

The various aspects and details described herein may used in combination with the disclosures of the following co-assigned patent applications in various locator device embodiments. These co-assigned applications, which may be collectively denoted herein as the "incorporated applications" for brevity, include U.S. patent application Ser. No. 10/268,641, entitled OMNIDIRECTIONAL SONDE AND LINE LOCATOR, filed on Oct. 9, 2002, U.S. patent application Ser. No. 11/970,818, entitled MULTI-SENSOR MAPPING OMNIDIRECTIONAL SONDE AND LINE LOCATORS, filed on Jan. 8, 2008, U.S. patent application Ser. No. 12/016,870, entitled RECONFIGURABLE PORTABLE LOCATOR EMPLOYING MULTIPLE SENSOR ARRAY HAVING FLEXIBLE NESTED ORTHOGONAL ANTENNAS, filed Jan. 18, 2008, U.S. patent application Ser. No. 11/077,947, entitled SINGLE AND MULTI-TRACE OMNIDIRECTIONAL SONDE AND LINE LOCATORS AND TRANSMITTER USED THEREWITH, now U.S. Pat. No. 7,619,516, U.S. patent application Ser. No. 13/161,183, filed Jun. 15, 2011, entitled GROUND-TRACKING DEVICES FOR USE WITH A MAPPING LOCATOR, U.S. Patent Application Ser. No. 61/485,078, entitled LOCATOR ANTENNA CONFIGURATION, filed on May 11, 2011, U.S. patent application Ser. No. 13/110,910, entitled USER INTERFACE DEVICES, APPARATUS, AND METHODS, filed May 18, 2011, U.S. patent application Ser. No. 13/214,209, entitled MAGNETIC SENSING USER INTERFACE DEVICE METHODS AND APPARATUS, filed Aug. 21, 2011, U.S. patent application Ser. No. 13/272,172, entitled MAGNETIC THUMBSTICK USER INTERFACE DEVICES, filed Oct. 12, 2011, U.S. patent application Ser. No. 13/292,038 entitled SLIM PROFILE MAGNETIC USER INTERFACE DEVICES, filed Nov. 8, 2011, and U.S. patent application Ser. No. 13/310,670, entitled MAGNETICALLY SENSED USER INTERFACE APPARATUS AND DEVICES, filed Dec. 2, 2011. The content of each of these applications is hereby incorporated by reference herein in its entirety.

The following exemplary embodiments are provided for the purpose of illustrating examples of various aspects, details, and functions of apparatus, methods, and systems for locating buried or hidden objects; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

EXAMPLE EMBODIMENTS

According to one aspect of the present disclosure, a locator may be configured to detect the variable reflectivity or coloration of ground or other surfaces or terrains, including markings laid on the ground and/or occasional encountered objects lying on the ground. To accomplish this, an LED light source, which may be highly directional, may be optionally combined with a near-range color sensor array.

In one aspect, a formed snoot may be coupled with a color sensor array in order to improve the directionality of returned light to the sensor array. The snoot may be a single formed set comprising multiple light-guiding tubes, for example. Alternatively, tubular snoots may be fabricated individually and bundled together in the assembly process or otherwise combined.

Referring to FIG. 1, an embodiment of a color sensing assembly 100 in accordance with certain aspects is illustrated. The color sensing assembly 100 may include a circuit board, such as printed circuit board (PCB) 102, and a set of outer reflectors 104, on which a snoot form 106 may be seated. For example, the SO17XA reflector produced by Illumination Management Solutions (IMS) located at 18242 McDurmott West, Irvine, Calif. may be used. The snoot form 106 may be a single molded array of tubular shapes in which six outer tubes 108 surround a single central tube 110. In such a configuration, the central tube 110 controls emitted light while the outer tubes control received light. The central tube may be finished internally with reflective coating to enhance light emission. Other configurations with different numbers and/or configurations of tubes may also be used in various embodiments.

Figure 2:
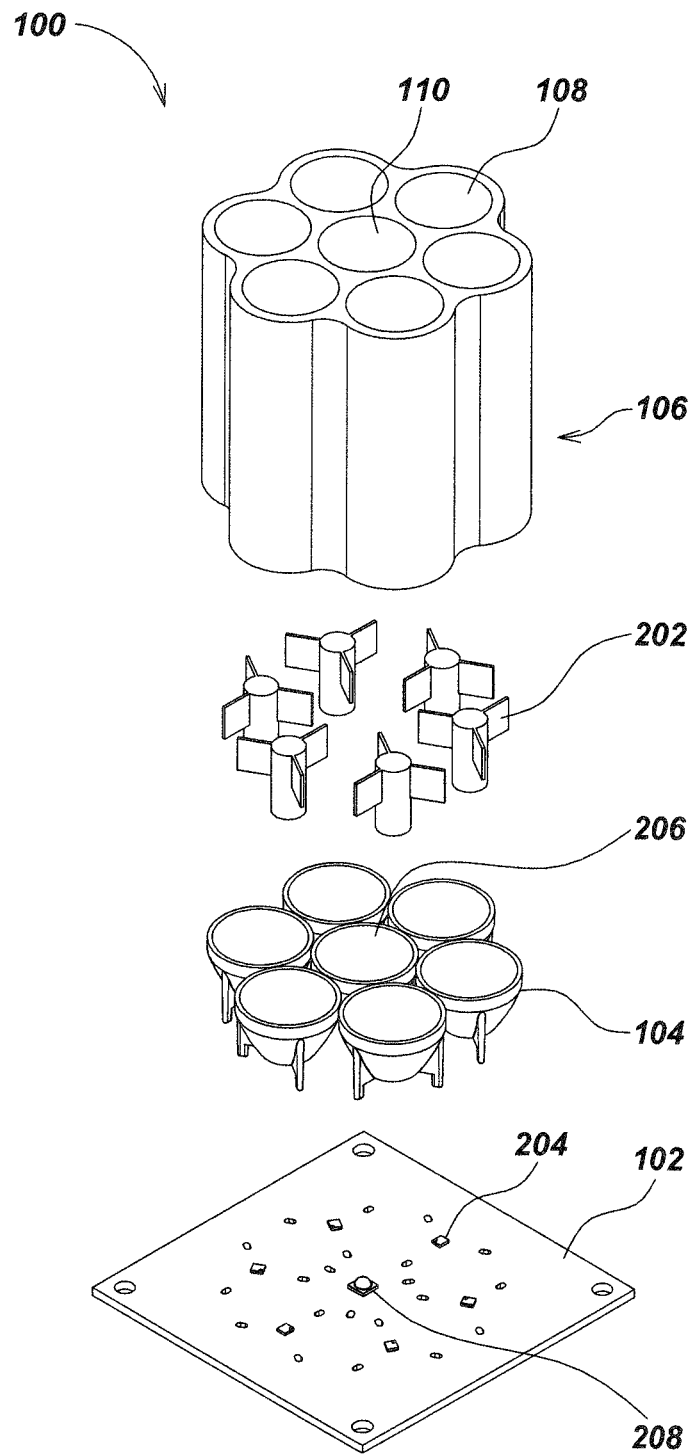
FIG. 2 is an exploded view of the color sensing assembly embodiment of FIG. 1.

Referring to FIG. 2, an exploded view of the color sensing assembly embodiment 100 of FIG. 1 is illustrated. In one aspect, one or more reflectors, such as outer reflectors 104 and a central reflector 206 may be disposed on circuit board 102. Reflectors 104 may be disposed around the central reflector in a circular arrangement. The outer reflectors 104 and central reflector 206 may be a three-dimensional parabolic form, the interior surface of which may be highly polished, and the apex of which may have a circular opening. The central reflector 206 may be seated over an LED emitter 208, such as, for example, a CREE X-Lamp LED, manufactured by Cree, Inc. of Durham, N.C. Each of the outer reflectors 104 may be seated over a digital color sensor 204 such as the Texas Advanced Optoelectronic solutions TCS3404, manufactured by Texas Advanced Optoelectronic solutions (TAOS) of Plano, Tex. A ray-blocking structure 202 may be disposed within each of the outer reflectors 104 to provide a measure of beam control of reflected light entering the channels of the snoot form 106.

Figure 3:
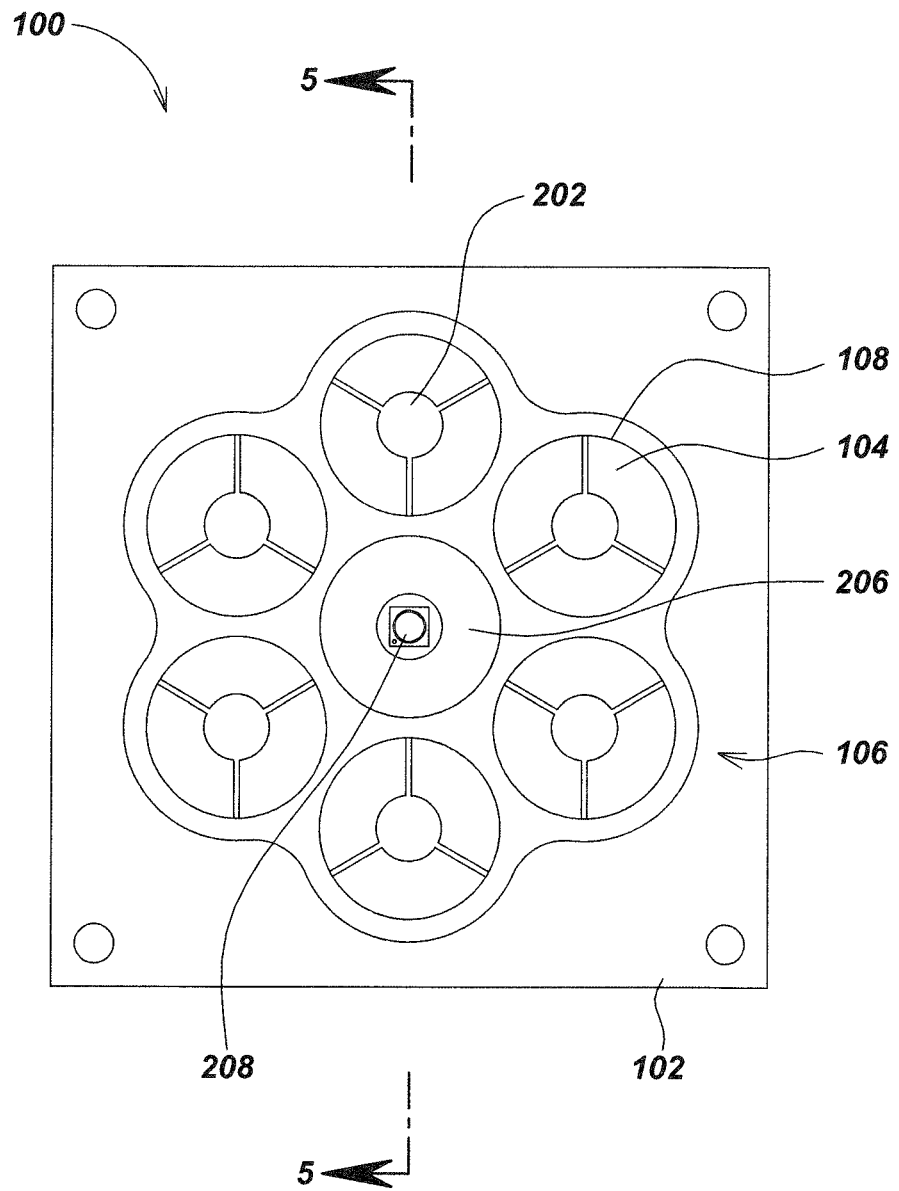
FIG. 3 is a top-down view of the color sensing assembly embodiment of FIG. 1.

Referring to FIG. 3, a top-down perspective view illustrates details of the color sensing assembly embodiment 100 of FIG. 1. In one aspect, reflectors 106, central reflector 206, and the snoot form may be mounted to circuit board 102. The ray blocking structure 202 disposed within each of the outer tubes 108 may limit incoming light rays traveling into the tube and reflector 104 to mostly parallel incoming rays. The LED emitter 208 may be located at the focus of the central reflector 206.

Figure 4:
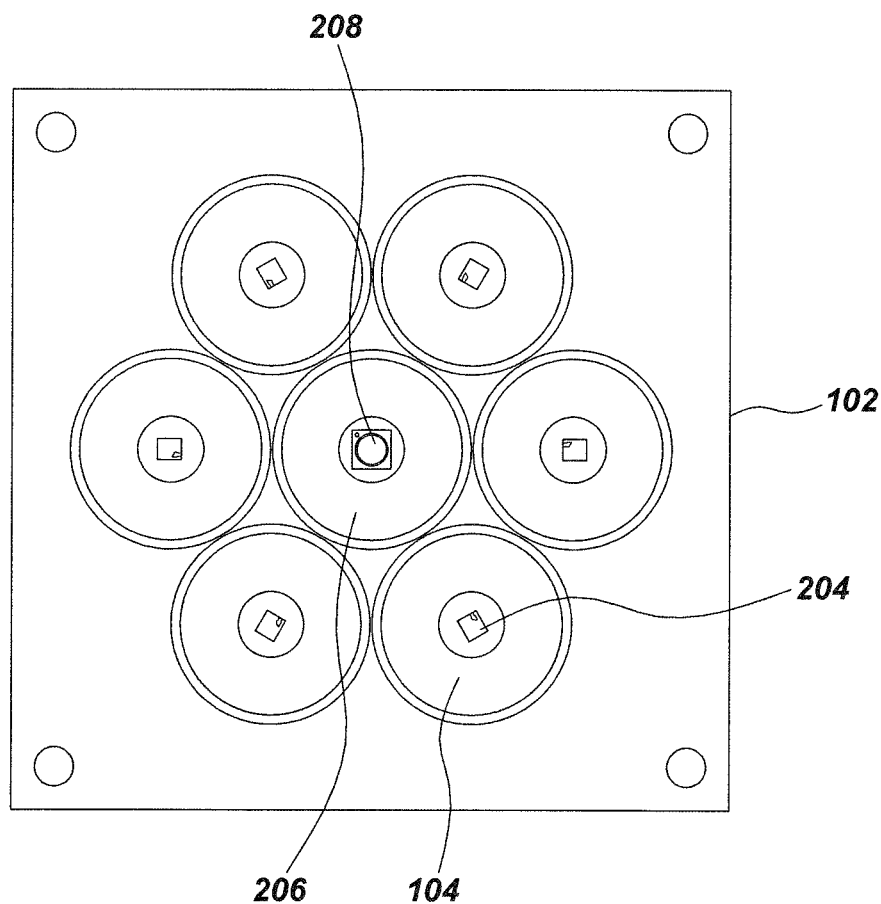
FIG. 4 is a top-down view illustrating details of an embodiment of an array of reflectors of FIG. 1, with the formed snoot set and ray-blocking structure removed.

Referring to FIG. 4, a top-down perspective view of the color sensing assembly 100 of FIG. 1, with the outer snoot form 106 (FIGS. 1-3) removed and the ray blocking structures such as 202 (FIGS. 2-3) removed, revealing outer reflectors 104 and the central reflector 206. Each of the outer reflectors 104 may be seated over a digital color sensor such as 204. The LED emitter 208 may be located at the focus of the central reflector 206.

Figure 5:
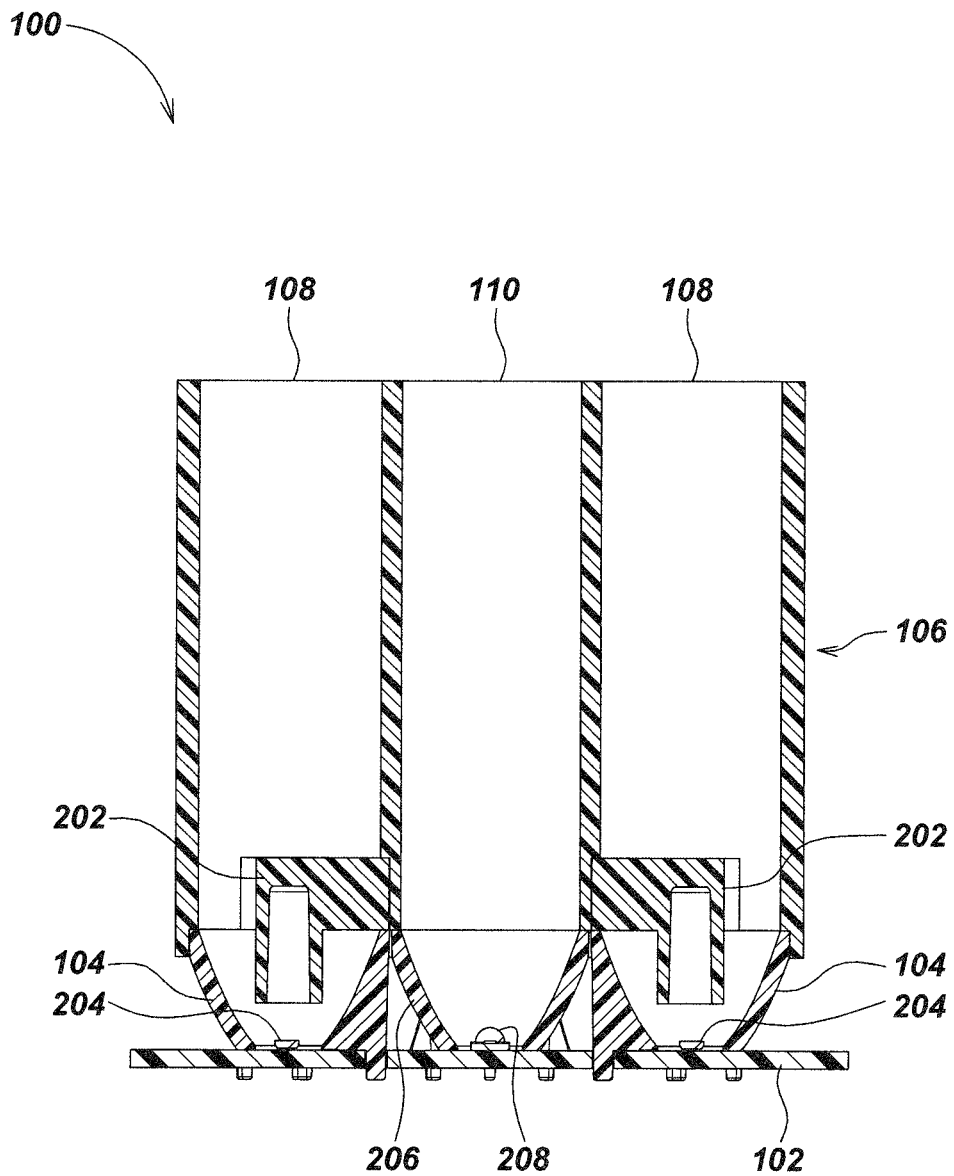
FIG. 5 is a side section view of the color sensing assembly embodiment of FIG. 1.

Referring to FIG. 5, a sectioned side view of the color sensing assembly 100 of FIG. 1 illustrates additional details. In an exemplary embodiment, the ray-blocking structure 202 may be disposed in the outer tubes 108 of the snoot form 106. The digital color sensors 204 and the central LED emitter 208 may be disposed on the surface of circuit board 102. One or more sensors and tubes, as well as varying lengths of tubes may be used.

Figure 6:
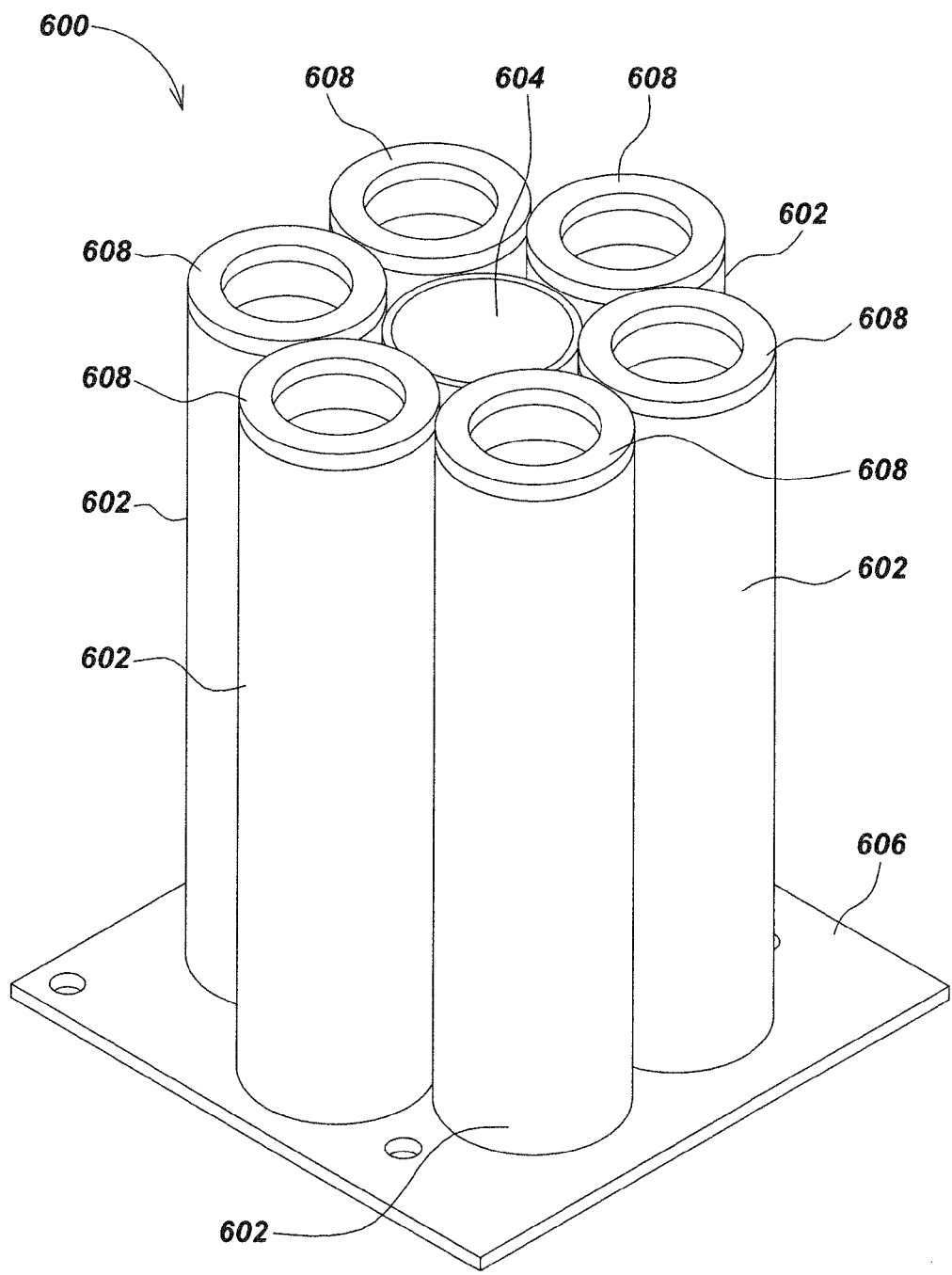
FIG. 6 illustrates an alternate embodiment color sensing assembly using a plurality of separate snoot tubes as an array of reflectors.

Referring to FIG. 6, an alternate embodiment color sensing assembly 600 is illustrated. In one aspect, each reflectors may each be fitted with an individually formed snoot. For example, six outer snoot tubes 602 and one central snoot tube 604 may be seated on a circuit board 606. Each of the outer snoot tubes 602 may be fitted with an aperture ring 608 for increasing the collimation of the admitted light beam by eliminating angled rays outside the central opening of the aperture ring.

The central snoot tube 604 may be manufactured of polished aluminum, for example, in order to enhance light transmission and dissipate LED heat. The outer snoot tubes 602 may be made of fiberglass, plastic, or a similar material.

Figure 7:
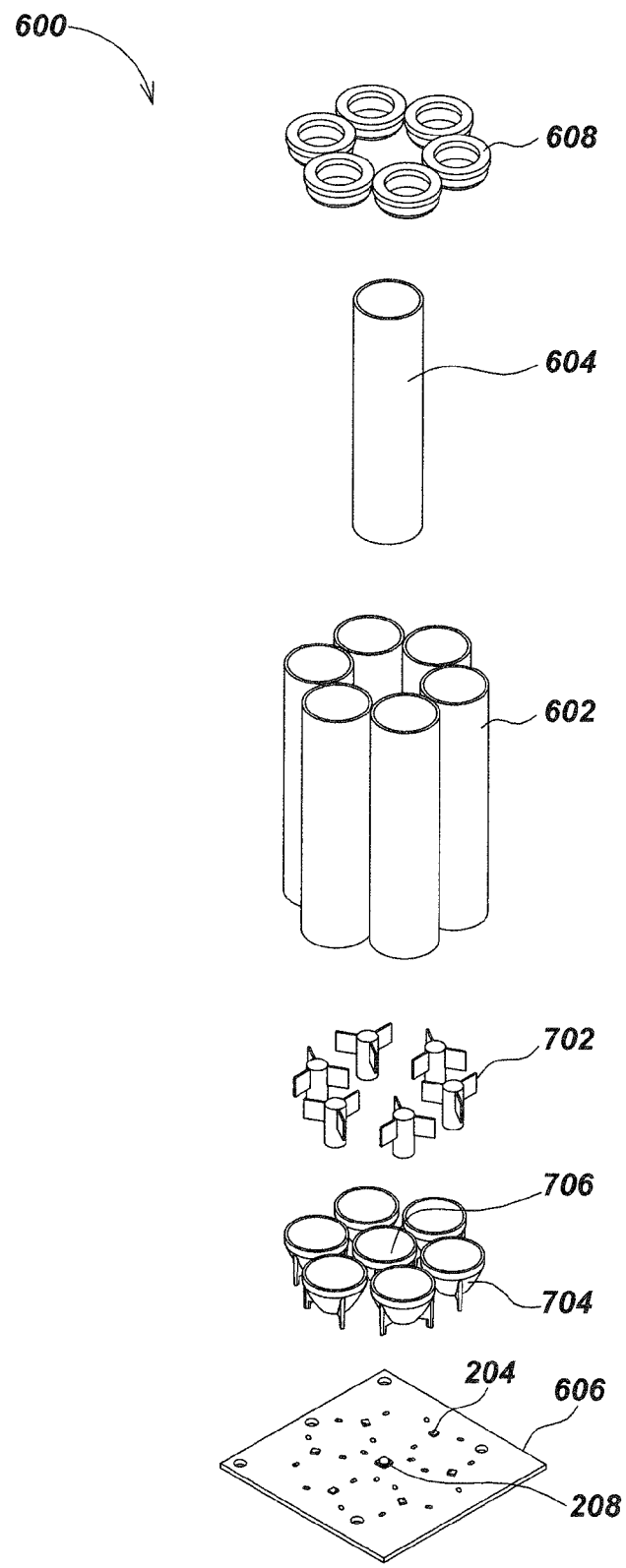
FIG. 7 is an exploded view of the alternate embodiment color sensing assembly of FIG. 6.

FIG. 7 is an exploded view of the alternate embodiment color sensing assembly 600 of FIG. 6. In one aspect, a set of reflectors 704 may be disposed on circuit board 606. The reflector may be a three-dimensional parabolic form, the interior surface of which may be highly polished, and the apex of which may have a circular opening. The central reflector 706 may, for example, be seated over an LED emitter 208 such as the CREE X-Lamp LED, manufactured by Cree, Inc. of Durham, N.C. Each of the outer reflectors 704 may be seated over a digital color sensor 204 such as TCS3404, manufactured by Texas Advanced Optoelectronic solutions (TAOS) of Plano, Tex.

A ray-blocking structure 702 may be seated within each of the outer snoot tubes 602 to provide a measure of beam control of reflected light entering the channels of the snoot tube 602. The central snoot tube 604 does not contain a ray-blocking form. Each of the outer snoot tubes 602 may be terminated at its outer end with an aperture ring 608 to enhance the collimation of light beams entering the snoot tube 602.

Figure 8:
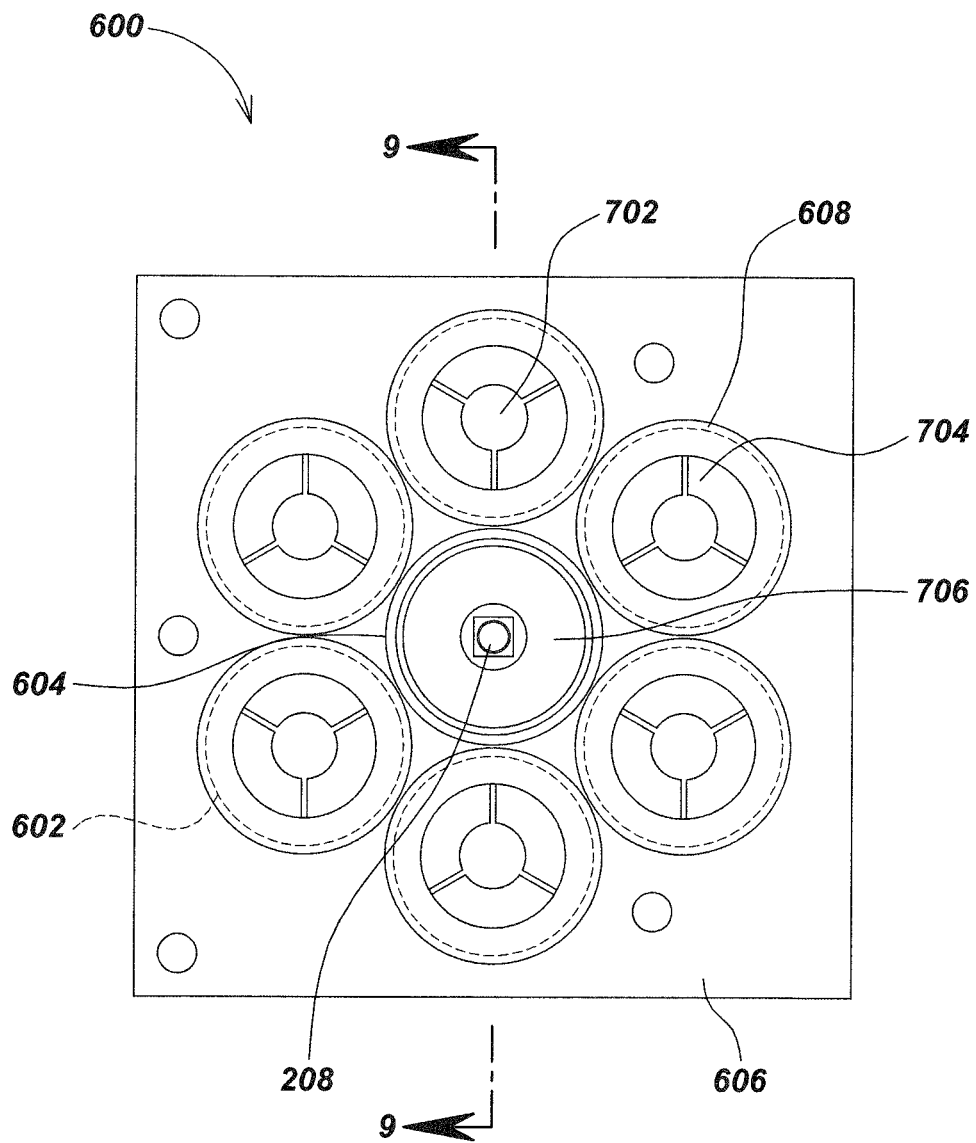
FIG. 8 is a top-down view of the alternate embodiment color sensing assembly of FIG. 6.

Turning to FIG. 8, a top-down view of the alternate embodiment color sensing assembly 600 of FIG. 6 is illustrated. In one aspect, the ray-blocking forms 702 may be disposed in the center of each outer snoot tube 602 (FIGS. 6-7). The central snoot tube 604 (FIGS. 6-7) may be seated over the LED emitter 208 (FIGS. 2-5 and 7) on the circuit board 606. Each outer snoot tube 602 may be fitted with an aperture ring such as 608. The inner reflector 706 and outer reflectors such as 704 may be used to guide and collimate light.

Figure 9:
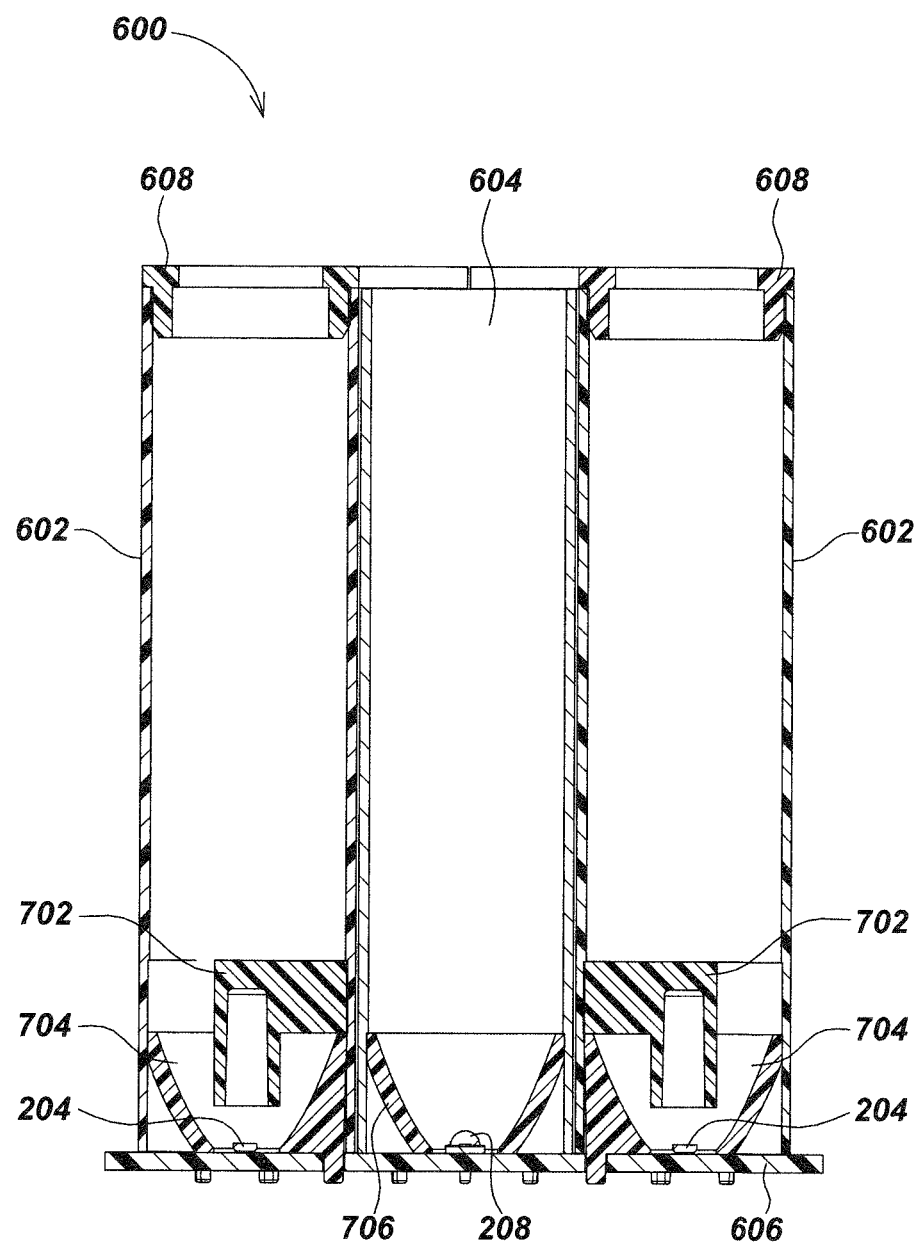
FIG. 9 is a sectioned side view of the alternate embodiment color sensing assembly of FIG. 6.

Turning to FIG. 9, a sectioned side view of the alternate embodiment color sensing assembly 600 of FIG. 6 is illustrated. Outer snoot tubes 602 fitted with aperture rings 608 and ray-blocking forms 702 may be seated over outer reflectors 704. Each outer reflector 704 may have a digital color sensor 204 seated at its open apex (focus), mounted on the circuit board 606. The central snoot tube 604 may be seated over the central reflector 706 which has the LED emitter 208 at its apex (focus), mounted on the circuit board 606.

In one aspect, a locating apparatus may be equipped with a distance sensor from which the distance of the locator from the ground at any moment during a locate operation may be measured in order to augment the accuracy of the locator's depth detection of buried targets and the precision of mapping operations.

Figure 10:
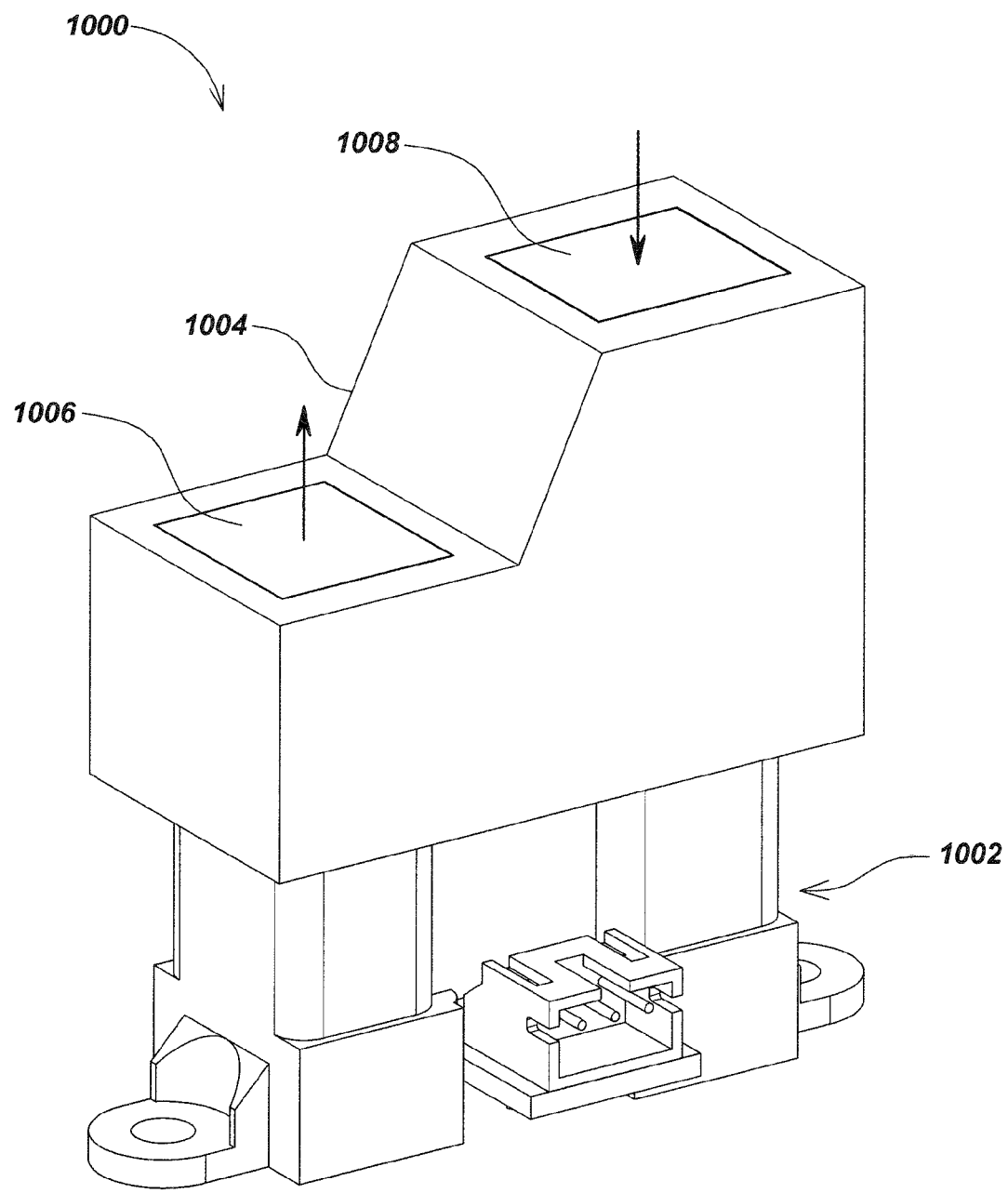
FIG. 10 is an isometric view of an embodiment of a distance-measuring sensor assembly equipped with a restrictive aperture.

Referring to FIG. 10, an isometric view of an embodiment of a distance-measuring sensor assembly 1000 is illustrated. Distance-measuring sensor assembly 1000 may include a distance measuring sensor 1002 fitted with an aperture unit 1004. The aperture unit 1004 may be used for operating the distance measuring sensor in full daylight conditions. The distance measuring sensor 1002 may be, for example, a GP2Y0A02YKF sensor unit available from SHARP Microelectronics of Camas, Wash. The distance measuring sensor 1002 may include a light emitter window 1102 (not shown in FIG. 10) and a light detector window 1104 (not shown in FIG. 10). Windows 1102 and 1104 may each optionally be covered by a polarizing filter, orthogonally biased to each other, to eliminate reflective glare which reduces detector accuracy. For example, a vertical polarized filter 1006 may be seated over the light emitter window and a horizontal polarized filter 1008 may be seated over the light detection window. In an alternate embodiment, the distance measuring assembly may be tilted approximately ten degrees from the vertical in order to achieve a similar improvement in accuracy by reducing the incidence of specular reflection from the ground surface. In such an embodiment, polarized filters may also be used in combination. Optionally, LH and RH circular polarizers may be used.

Figure 11:
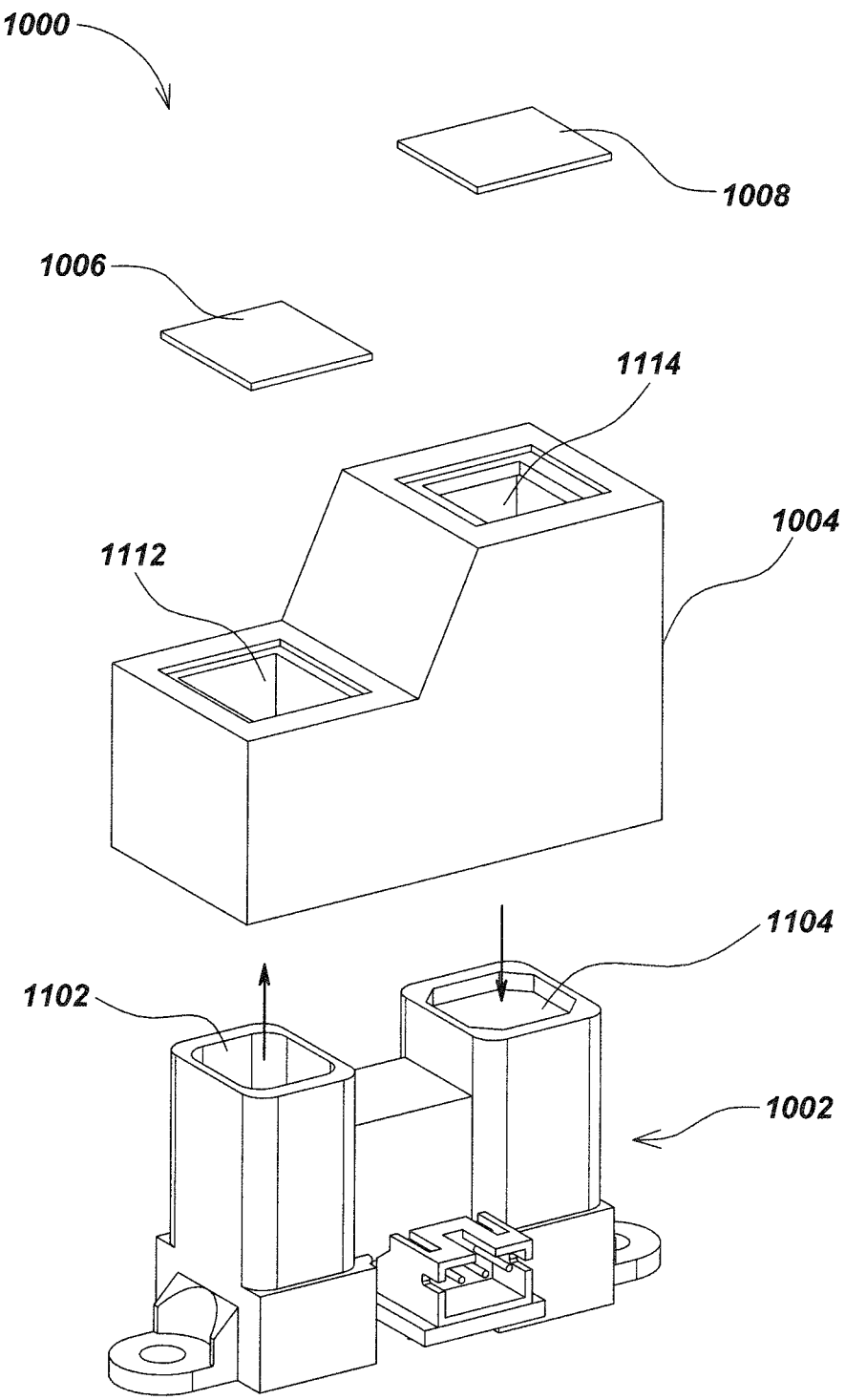
FIG. 11 is an exploded view of the distance-measuring sensor assembly embodiment of FIG. 10.

Referring to FIG. 11, an exploded view of the distance-measuring sensor assembly embodiment 1000 of FIG. 10 illustrates additional details. As described in the preceding example, the vertical polarized filter 1006 (FIG. 10) may be seated in opening 1112, which may be disposed over the light emitter window 1102. A horizontal polarized filter 1008 may be seated over an opening 1114, which may be disposed over the light detection window 1104. Polarized filters 1006 and 1008 may be used to reduce noise in the resultant signal due to specular reflected light, which may be encountered from surface water or ice, in contact with the distance-measuring sensor 1002.

Figure 12A:
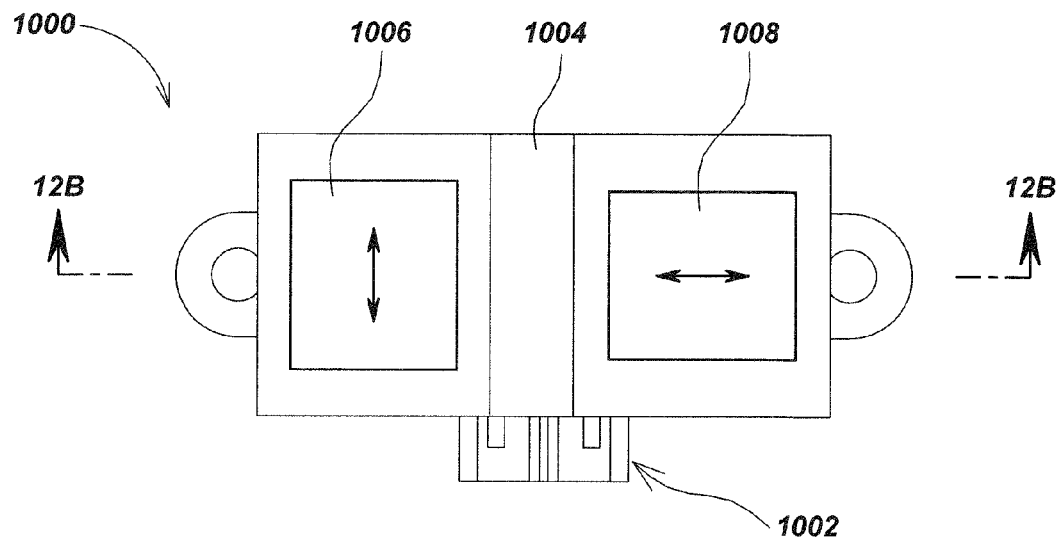
FIG. 12A illustrates details of the polarizing filters used in the embodiment of the distance-measuring sensor assembly of FIG. 10.
Figure 12B:
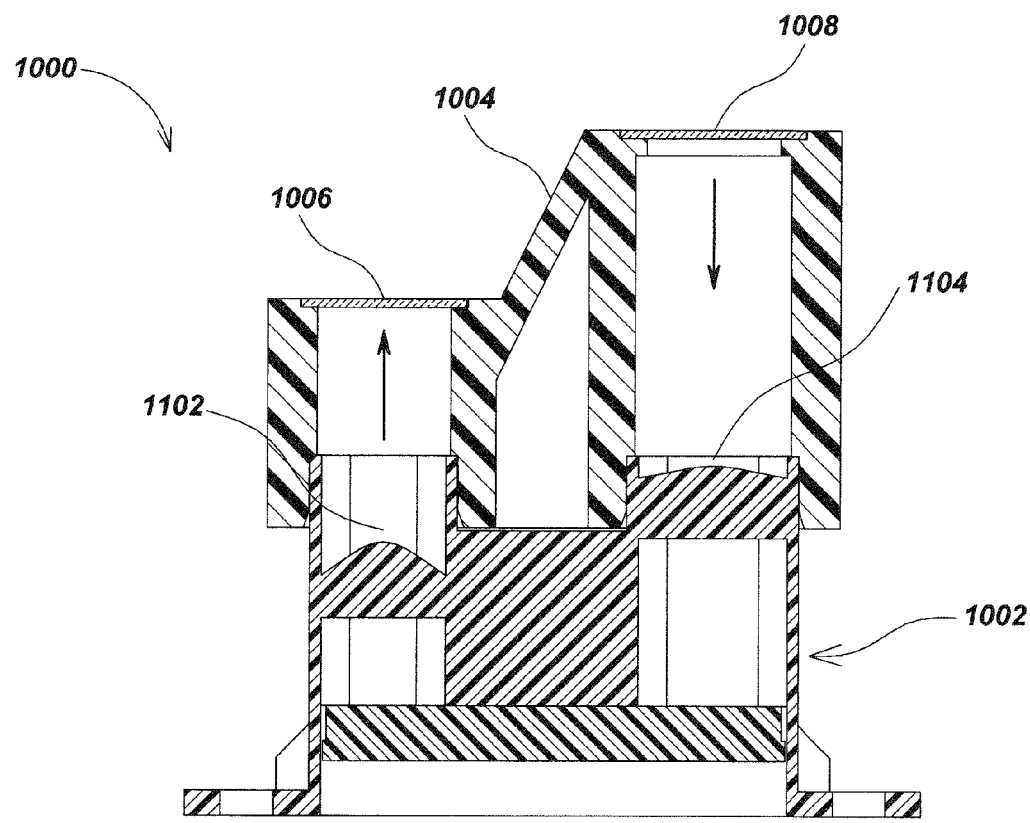
FIG. 12B is a section view of the distance measuring sensor assembly embodiment of FIG. 10.

Turning to FIGS. 12A and 12B, the polarization of the vertical filter 1006 and the horizontal filter 1008 are further illustrated in a top-down view (FIG. 12A) of the distance measuring sensor 1002 fitted with aperture unit 1004. In FIG. 12B the assembly is shown in section view.

In one aspect of an exemplary embodiment, color sensors may be combined with distance measurement sensors to refine distance measurement, which can vary with the color of the surface at which the distance-measurement unit is pointed. By developing a calibration response the accuracy of distance measurement may be improved significantly. Initial experimental results indicate that a calibrated response of this kind may enhance the distance measurement accuracy to an order of millimeters.

In another aspect, the use of this combination of sensors with a utility locating receiver provides data which may be used to integrate locate detections with maps, satellite images, and/or area photographs. By integrating distance measurement and color detection, for example, the difference between a concrete sidewalk and an adjoining blacktop road surface becomes evident, as does the vertical difference between the sidewalk and the road. Transitions from grass to pavement, or different kinds of ground or other surfaces, may be identified and coordinated with image data of various kinds. In effect, the stored data from the locator may be used as a line scan imager, capable of storing sectional images of the ground surface over which the locator is passing. The point at which the locator crosses from a road surface to the edge of an embedded manhole cover, for example, may become a reference point in integrating the locator data with an aerial photograph of the same street area. This may be done in a processing element using one or more processor and one more memories.

Figure 13:
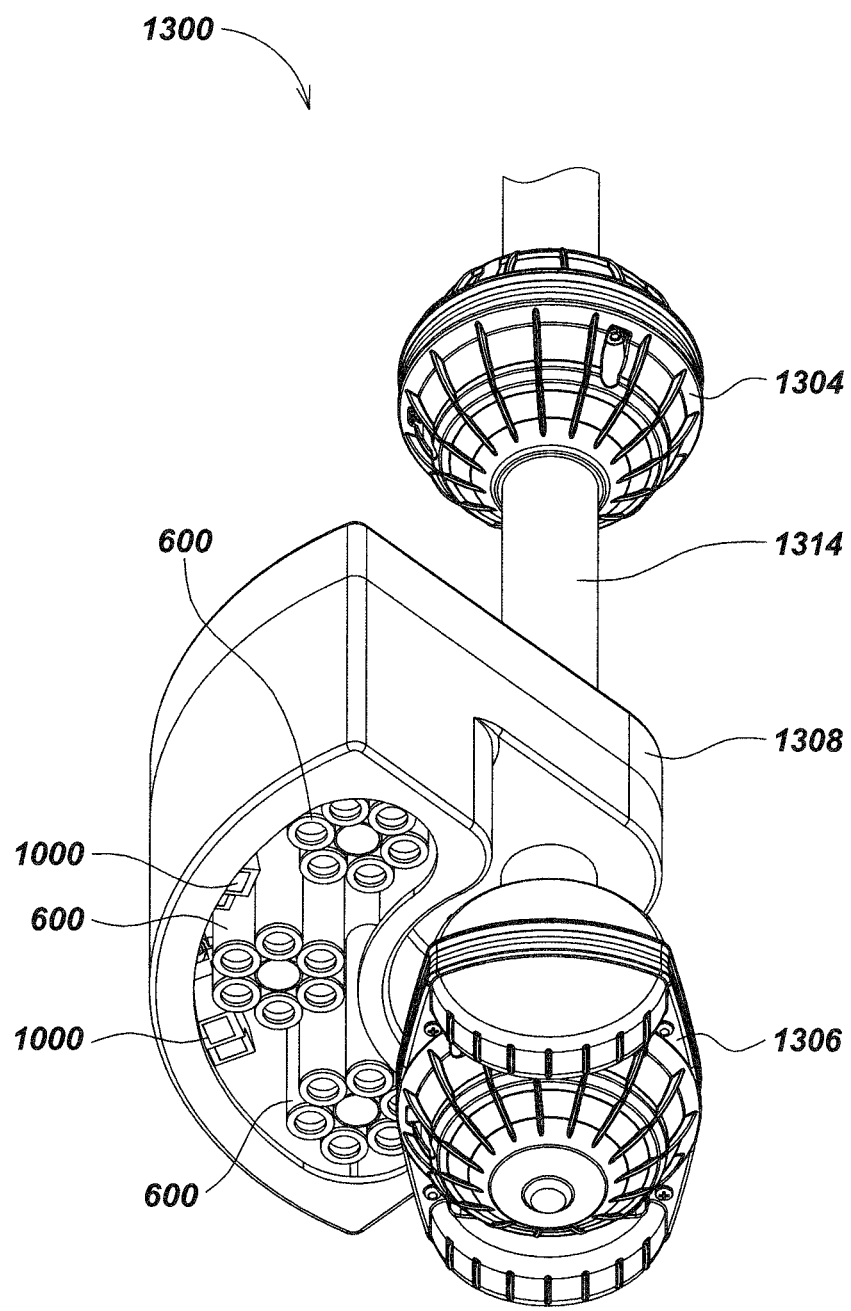
FIG. 13 illustrates an embodiment of a ground tracking system.

Turning to FIG. 13, an embodiment of a locating device 1300 is illustrated. The locating device 1300 may be constructed in accordance with details of embodiments as described in U.S. patent application Ser. No. 12/947,503, entitled IMAGE BASED MAPPING SYSTEMS, filed on Nov. 16, 2010, the contents of which are incorporated by reference herein. The locator device embodiment 1300 has a locator body (not shown in FIG. 13), an upper antenna ball 1304, and a lower antenna enclosure 1306. The antenna arrays enclosed within the upper antenna ball 1304 and within the lower antenna enclosure 1306 may be multi-antenna arrays constructed in accordance with details of embodiments as described U.S. Pat. No. 7,741,848 entitled ADAPTIVE MULTICHANNEL LOCATOR SYSTEM FOR MULTIPLE PROXIMITY DETECTION, issued Jun. 22, 2010, and U.S. Patent Application Ser. No. 61/485,078 entitled LOCATOR ANTENNA CONFIGURATION, filed on May 11, 2011, the entire contents of which are incorporated by reference.

A lobe-shaped casing 1308 may be mounted to antenna mast 1314 between the upper antenna ball 1304 and the lower antenna enclosure 1306. Casing 1308 may contain inertial sensors, gyroscopic sensors, accelerometers, such as multi-axis accelerometers, compass sensors, and/or other sensors as described in the above mentioned referenced applications. The outer sector of the lobe-shaped casing 1308 may house three color sensor arrays 600, such as that illustrated in FIGS. 6-7, each of which may include six outer tubes and one central tube as described under FIGS. 6-7. Alternatively, these arrays could be formed as described in FIGS. 1-2, using a single formed snoot array.

Each of the color sensing assemblies 600 emits white light from its central LED emitter 208 in (FIGS. 2-5 and 7) and captures reflected light, which may be largely collimated by the snoot and ray blocking structures. The lobe-shaped casing 1308 may also supports distance-measuring sensors 1000, at, for example, two locations, each of which may emit ~850 nm light from a light emitter and senses return light from a reflecting surface by way of a detector cell as illustrated in FIGS. 10-11.

In one aspect, a color sensor unit, such as TCS3404, manufactured by Texas Advanced Optoelectronic solutions (TAOS) of Plano, Tex., may be used, which produces four data channels reflecting a series of detection values for red, blue, green and "clear" filtered photodiodes. In such a device, the internal conversion (analog to digital) cycles may be synchronized by an internal pulse. The array of such sensors illustrated in FIGS. 6-7 contains six devices, and the locator 1300 with three such arrays thus produces (3×4×6), or 72 data channels. These devices may be sampled at a rate such as 100 Hz, for example, which may allow some overlap between the sequential samples captured relative to velocity of the locator platform over the ground surface. Other data rates may be used to meet design requirements. Additionally, locator 1300 may have two channels of distance measurement from the two distance measurement sensors 1000.

Figure 14:
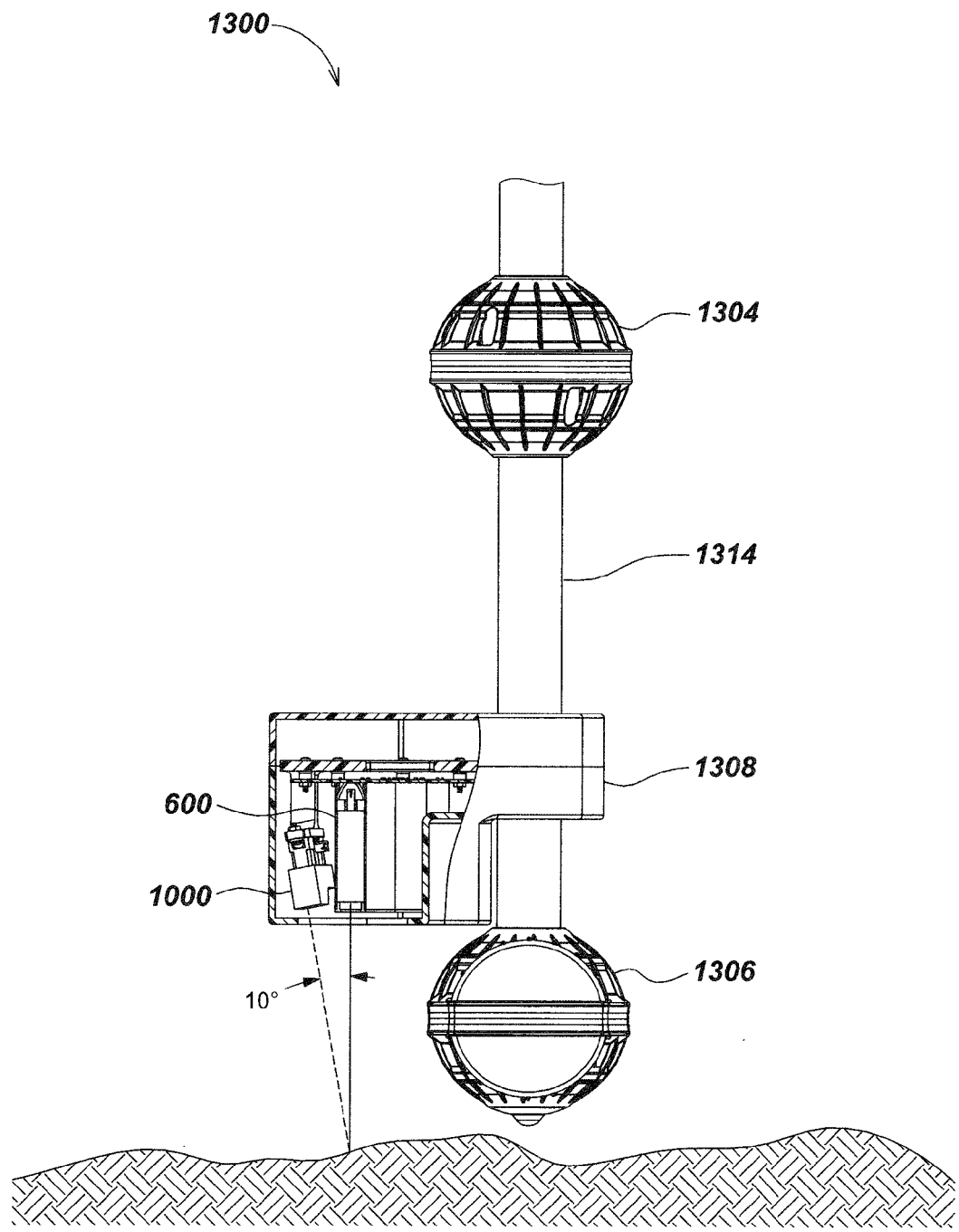
FIG. 14 is a side view of the ground-tracking system embodiment of FIG. 13 in use, illustrating the beam-paths provided by the color sensors and the distance-measuring sensors.

Turning to FIG. 14, the directly vertical line of sight of the color-sensor arrays 600 may be combined with an approximate inward-tilted 10-degree angle of orientation of the distance-measurement sensors 1000. By tilting the distance-measuring sensor 1000 inward by approximately ten degrees, the problem of specular reflection from shiny surfaces such as puddles of water, for example, causing inaccuracy in the distance measurement of the sensor 1000 may be reduced or avoided, and the accuracy of the distance measurements obtained may be improved.

Figure 15A:
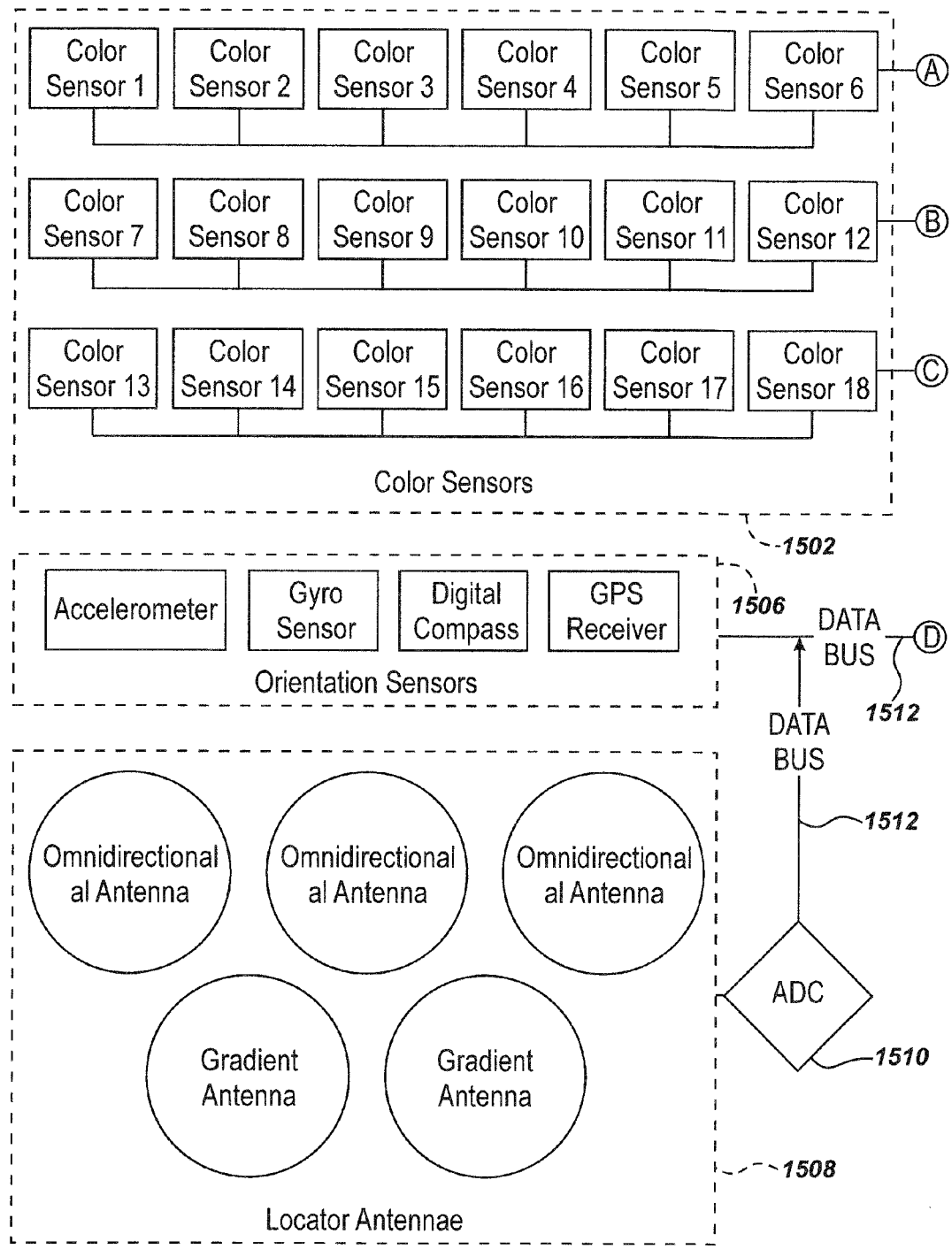
FIG. 15A and FIG. 15B are functional block diagrams illustrating the circuitry of a ground tracking system embodiment.
Figure 15B:
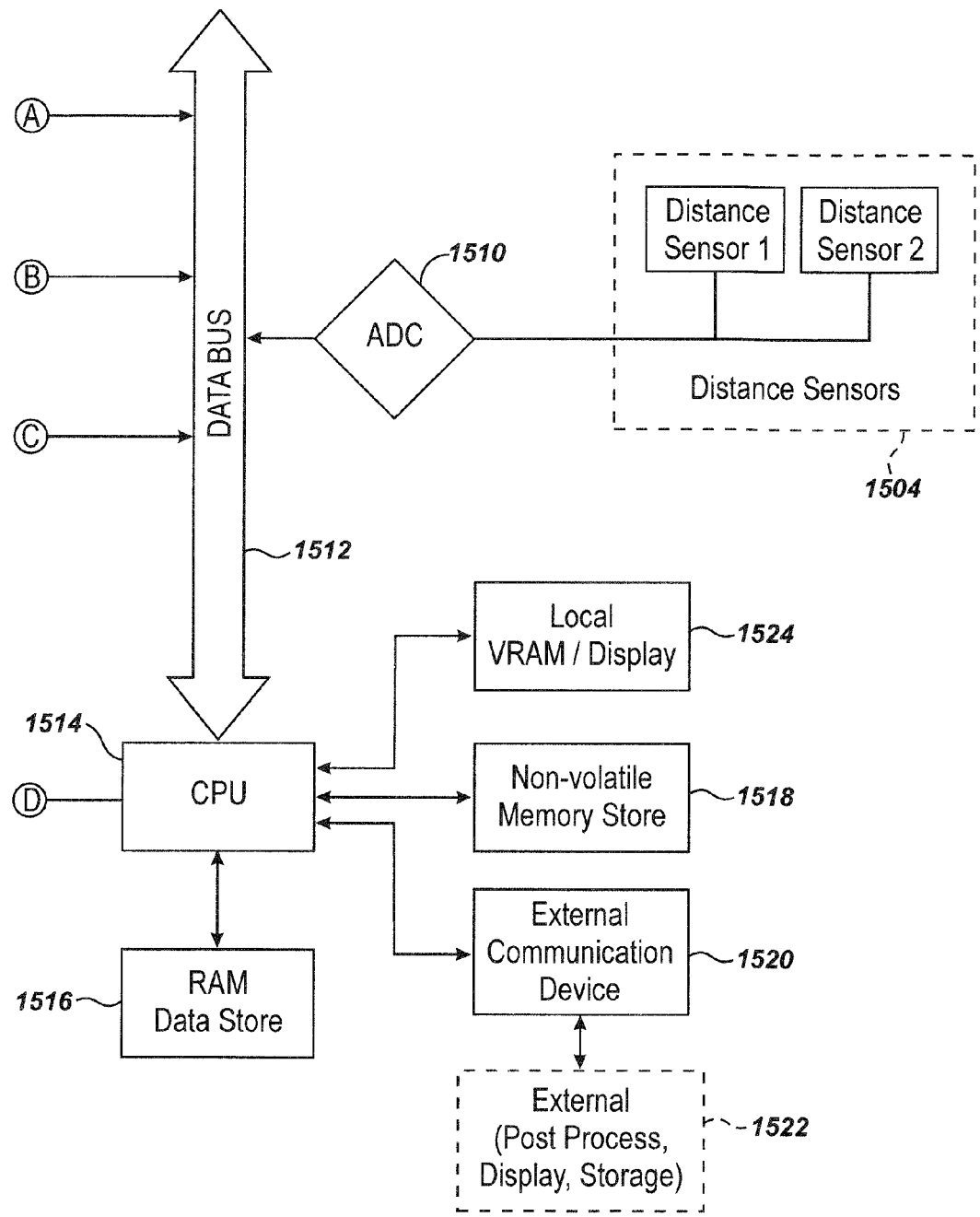

Turning to FIGS. 15A and 15B, a block diagram illustrates the system components of an exemplary locator embodiment, such as locator embodiment 1300 (FIG. 13). The locator 1300 (FIG. 13) may include several groups of sensors, including an array of color sensors 1502, one or more distance sensors, 1504, one or more orientation sensors 1506, such as an accelerometer, a gyro sensor, a digital compass, and a GPS receiver, and the like, and the locator antennas 1508, which may include omnidirectional and gradient antennas. The output from one or more analog sensors, which may include locator antennas 1508 and distance sensors 1504, may be channeled through analog to digital converters 1510. Digital output may be routed on a data bus 1512 to a central processing unit 1514, which may be linked to an on-board random-access memory module 1516 and a non-volatile memory storage unit 1518 such as, for example, a flash memory or micro-disk device. Data may be passed from the central processing unit 1514 to an external communication device 1520 which may include, for example, a UART. Data may be transmitted by the external communication device 1520 by wireless or wired means to external units 1522 such as, for example, external display, storage, or post-processing units. Data may be transferred to a local video memory (VRAM) and display unit 1524 from the central processing unit 1514.

Figure 16:
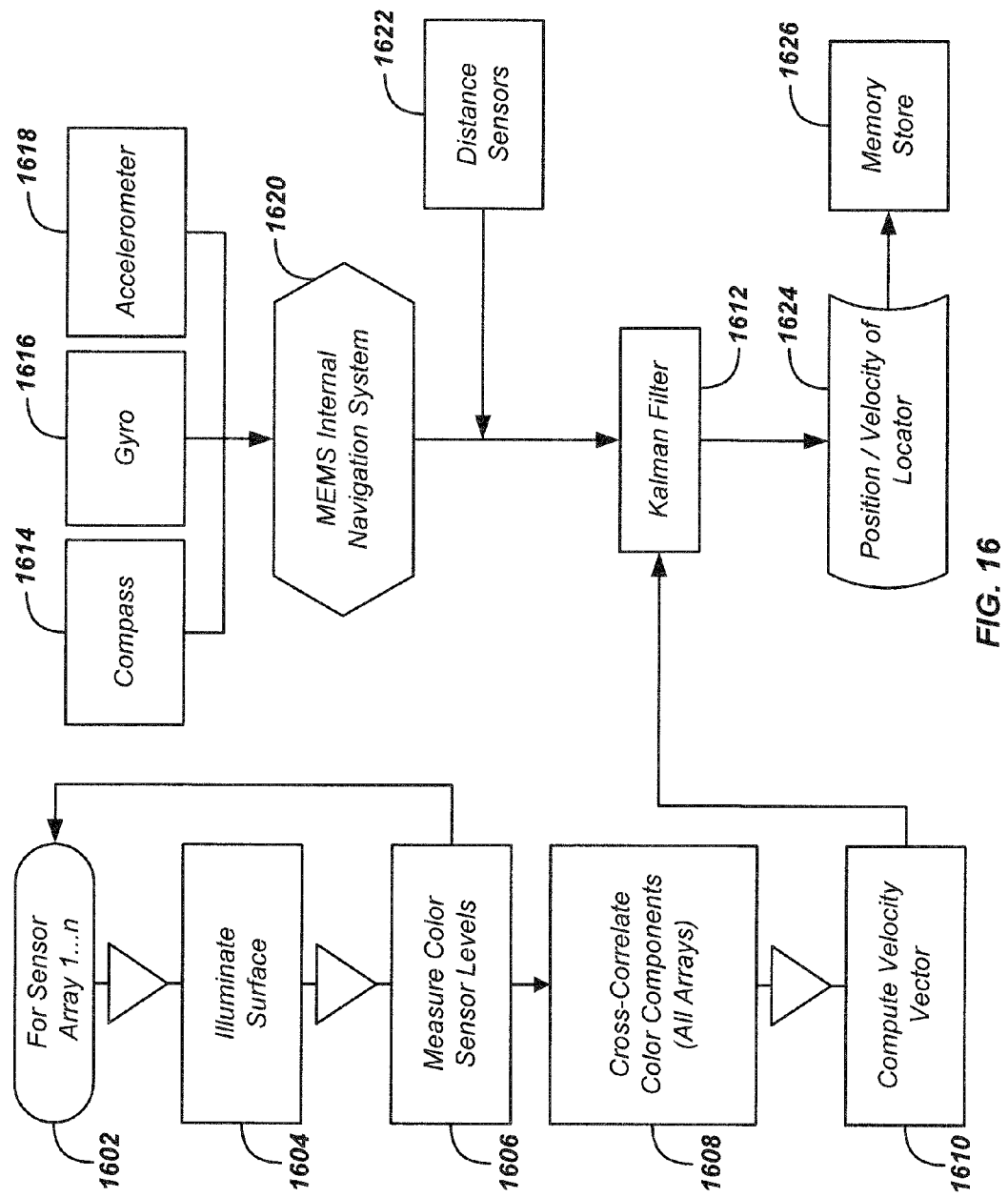
FIG. 16 is a flow chart illustrating an embodiment of processing of data from the plurality of sensors in the ground tracking system of FIG. 13.

Turning to FIG. 16 the processing flow of an exemplary locator is described. A sensor array loop 1602 may occur for each color-sensor set 1 . . . n in which the array goes through an optional illumination stage 1604 transmitting light toward the ground surface from the central LED, followed by a measurement stage 1606 during which the levels for each color component from each array are measured and converted into digital data. The values for each channel and each sensor unit are cross-correlated for all arrays in a cross-correlation stage 1608. Based on the cross-correlation, a computation 1610 determines the velocity vector and the resultant may be fed into a Kalman filter 1612. Sensor data in digital form from a compass 1614, gyro IC 1616 and one or more accelerometers 1618 are captured as part of the MEMS inertial navigation system 1620 whose output may be also fed logically to the Kalman filter 1612. Digital responses from the plurality of distance sensors 1622 may be also channeled to the Kalman filter 1612. The integration and weighting of these data within the Kalman algorithm result in a computed position and velocity 1624 for the locator at a specific point in time, which may be stored with a corresponding time-tag in on-board memory 1626. Such data may be transmitted for post-processing to an external platform 1520 (FIG. 15).

In an exemplary locator, such as locator 1300, there are N color sensors i. Each channel from each sensor may be measured as function of time T and cross-correlated with every other color sensor. For each cross correlation there may be a peak value at some time offset $T_{ij}$ and a spacing vector between each pair of color sensors being cross-correlated, $\vec{\delta}_{ij}$. There is also a distance $d_{ij}$ between the two sensors such that:

$$d_{ij} = x_{ij}\hat{x} + y_{ij}\hat{y} = \vec{v} * \tau_{ij}$$

For the first triple of color sensors the following equations obtain:

$$x_{12}\hat{x} + y_{12}\hat{y} = v_x \tau_{12}\hat{x} + v_y \tau_{12}\hat{y}$$

$$x_{23}\hat{x} + y_{23}\hat{y} = v_x \tau_{23}\hat{x} + v_y \tau_{23}\hat{y}$$

$$x_{13}\hat{x} + y_{13}\hat{y} = v_x \tau_{13}\hat{x} + v_y \tau_{13}\hat{y}$$

$$x_{12}\hat{x} + y_{12}\hat{y} = v_x \tau_{12}\hat{x} + v_y \tau_{12}\hat{y}$$

$$x_{23}\hat{x} + y_{23}\hat{y} = v_x \tau_{23}\hat{x} + v_y \tau_{23}\hat{y}$$

$$x_{13}\hat{x} + y_{13}\hat{y} = v_x \tau_{13}\hat{x} + v_y \tau_{13}\hat{y}$$

Analyzing the arrangement of the spacing vectors $\vec{\delta}_{ij}, \vec{\delta}_{ij}$ and the distance $d_{ij}$, $d_{ij}$, yields additional equations. If the first sensor is at the origin, the second sensor at $+\delta\hat{x}$ and the third sensor at $+\delta\hat{x}$, then, it can be shown for example that:

$$\tan\theta = \frac{d_{12}}{d_{12}}$$

$$\sin(45° - \theta) = \frac{d_{23}}{\delta_{23}}$$

$$\cos\theta = \frac{d_{13}}{\delta}$$

$$d_{12} - \sqrt{x_{12}^2 + y_{12}^2}$$

$$d_{13} - \sqrt{x_{13}^2 + y_{13}^2}$$

$$d_{23} - \sqrt{x_{23}^2 + y_{23}^2}$$

This results in a system of twelve equations and twelve unknowns which may be readily solved. For each triple of color sensors, solving this system of equations yields the velocity vector $\vec{v}\,\vec{v}$. Many sensors yield many velocity vectors forming an optical flow field. The optical flow field may be used to find the velocity and rotation of the locator relative to the ground.

In this manner, by tracking the covariance and correlation of these separate data channels, motion over ground may be computed at the same time as an accurate height above ground is computed (using distance-measuring sensor data). These computations may be correlated with gyroscopic sensor detections and accelerometer sensor detections to provide continuous or periodic calibration to accelerometers, to integrate distance calculations into the changes in color-sensor data, and to simultaneously provide an ongoing stream of image capture in the immediate field of view of the color-sensor arrays.

A locator such as 1300 (FIG. 13) may operate as a line-scan camera, as well as an optical ground tracking device, and the data acquired may be post-processed to integrate locator detections of underground utilities or other buried targets with satellite images of terrain, local photographs, or geo-coordinated maps. GPS sensors may be integrated into such a locator to support this process.

In an alternate embodiment, a parabolic or spherical mirror or reflector may be used to steer reflected light to a sensor. The use of a parabolic reflector provides a higher degree of collimation to the light received by the light sensors. In such an embodiment, a large parabolic or spherical reflector will provide more parallel light than a small one. The use of only the parallel (or nearly so) components in the light stream impacting the sensors provides the advantage of a consistent tracking of velocity over ground independent of the height above ground of the locator. Using the parallel components of light means that convergence and divergence of the incidental light rays are largely eliminated, which in turn means that greater or lesser height will not substantially modify the ground tracking calculations.

Figure 17:
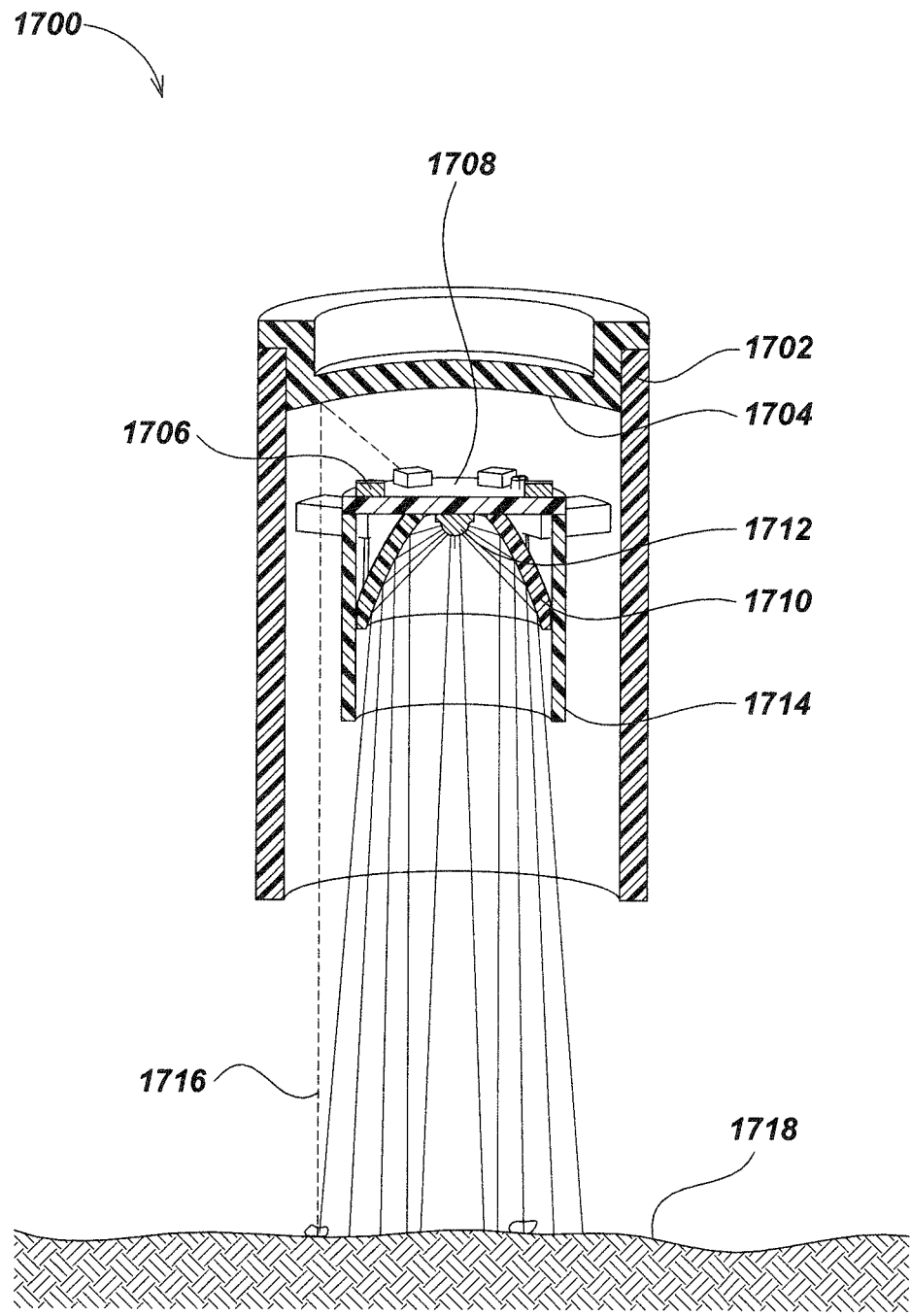
FIG. 17 illustrates details of an alternate embodiment reflector assembly using a parabolic or spherical reflector in assembly.

Turning to FIG. 17 a reflector assembly 1700 may include a tubular form 1702 at the upper end of which a parabolic or spherical reflector 1704 may be seated. Aspheric or elliptical reflectors could also be used. An array of sensors such as sensors 1706 may be disposed on the upper surface of a circular circuit board 1708, while an LED reflector 1710 may be centrally mounted on the lower surface of circuit board 1708. An LED emitter 1712 may be centrally mounted within the LED reflector 1710 within an inner aperture tube 1714. Optionally, timed bursts of light 1716 are emitted by the LED emitter 1712 which strike the ground 1718 and reflect from it. The reflections of such light rays 1716, striking the parabolic reflector 1704, are guided toward the sensors such as 1706. Lenses may be added to alter the focal region of reflected light from the parabolic reflector 1704. Multiple reflector assemblies 1700 may be installed in a single locator, and the outputs from each may be correlated. The construction of the reflector assembly 1700 is such that both the LED reflector 1710 and the parabolic reflector 1704 may collimate the light rays and increase the parallelism, and the location tracking may be significantly less distorted by variations in the height of the locator above the ground, since the divergent and convergent light paths tend to be excluded. Alternatively, such a locator may be designed using a single large parabolic reflector.

Figure 18:
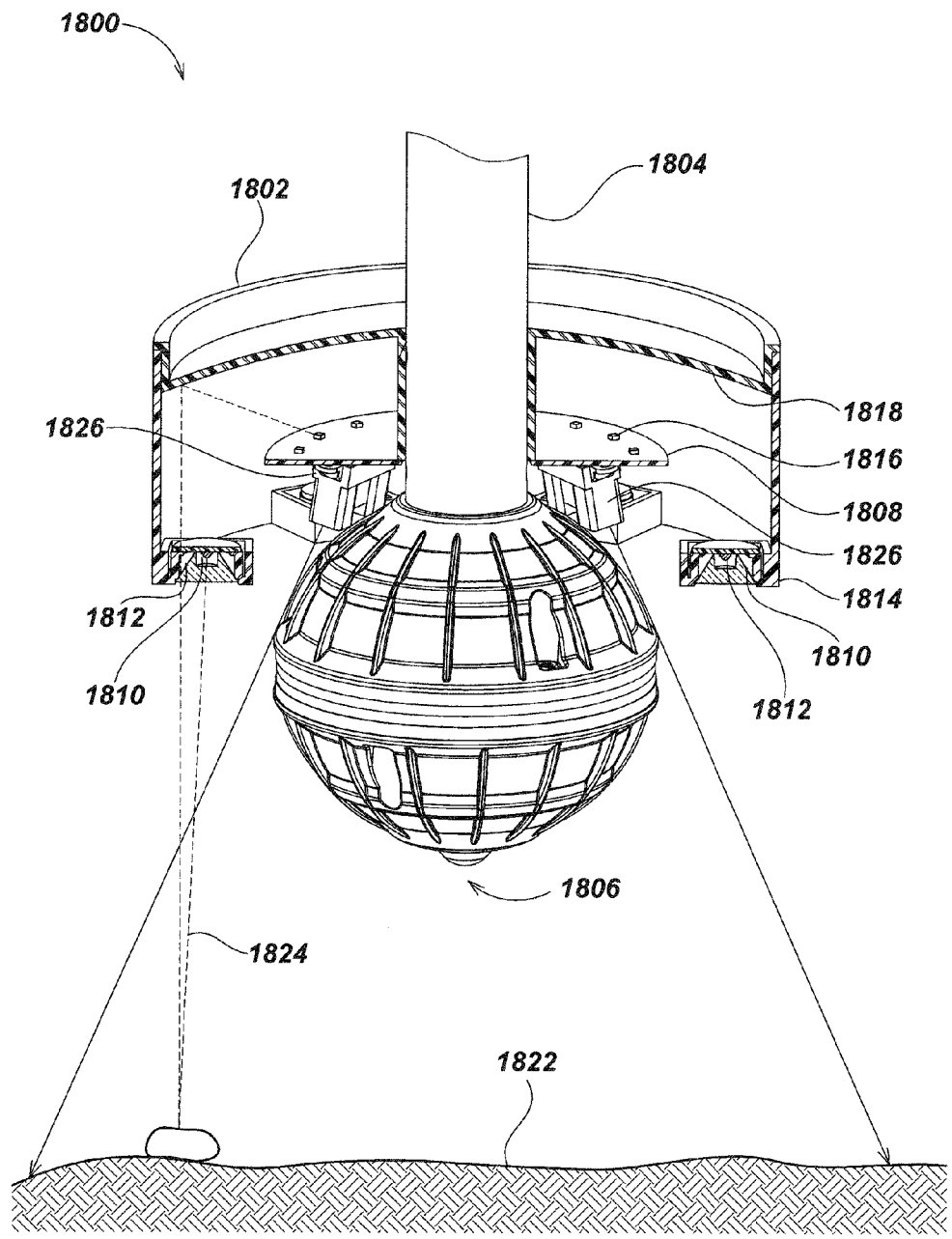
FIG. 18 illustrates a section view of an alternate embodiment ground tracking system utilizing a larger parabolic or spherical mirror.

Turning to FIG. 18, a section view of an alternate embodiment ground tracking system utilizing a larger parabolic or spherical mirror is illustrated. A locator 1800 may be fitted with a housing 1802 fitted around the locator mast 1804 near the lower antenna module 1806. The housing 1802 may enclose a circuit board 1808. A plurality of LED emitters 1810, each fitted with a reflector 1812 may be optionally fixed to the lower surface of the circuit board 1808, or on extender arms or formed wings 1814 as shown, for example, which place the emitter near the lower antenna module 1806. A gap may be used for the passage of light between lower antenna module 1806 and the LED emitters 1810 and 1812. Other means of situating the emitters 1810 may be used. Eighteen sensor arrays such as 1816 may be evenly distributed around the upper surface of the circuit board 1808. At the upper interior surface of the housing 1802, a large parabolic mirror 1818 may be seated such that it reflects emitted light returning from the ground surface 1822 and redirects it toward the sensor arrays 1816. The focal length of the parabolic reflector 1818 may be adjusted by means of optional lenses to optimize the sensor array detection of the reflected light. Light rays such as 1824, for example, may be reflected from the ground 1822, pass through the aperture outside the circuit board 1808, and may be reflected from the inner surface of the parabolic reflector 1818 to strike sensors 1816. Due to the collimating effect of the parabolic reflector 1818 and the LED reflector 1812, the light which arrives at the sensors 1816 may be collimated, as the less parallel rays may be excluded. This provides a ground-tracking calculation more independent of the instrument's height above the surface of the ground.

The use of this large parabolic or spherical reflector construction may permit a larger aperture, which may allow long time-slots for the integration of image data and an increase in sensitivity to locator movement over ground.

Data transformation and processing circuits may comprise a processing element, and may be mounted to circuit board 1808. Alternatively, the data may be transmitted to a processor within the main body of the locator (not shown here). In processing the outputs of the light sensors 1816, an integrated circuit, such as an FPGA dedicated to performing the necessary computations, may be used, and may be located on the circuit board 1808, or in the body of the locator (not shown). In such processing, the values of every sensor in each array may be cross-correlated with those of every other sensor in every array repeatedly, permitting the computation of changes in location over the ground 1822. Other sensors, such as magnetometers, inertial sensors, and one or more distance sensors 1826 may optionally be added to the casing or the circuit board. Data from such supplementary sensors may be included in the cross-correlation process as appropriate to refine the calculation of motion.

The LED reflector 1812 may be a "total internal reflector" (TIR) high-powered LED light unit, fitted with beam-forming optics, which forms an elliptical-shaped beam. Each reflector lens may be sealed. LEDs may emit white light or light of some designed frequency, such as red light. For example Cree XP-E or XP-C TIR LED units available commercially from Carclo Technical Plastics, 111 Buckingham Ave, Slough, Berkshire, SL1 4PF, England, may be used.

Figure 19:
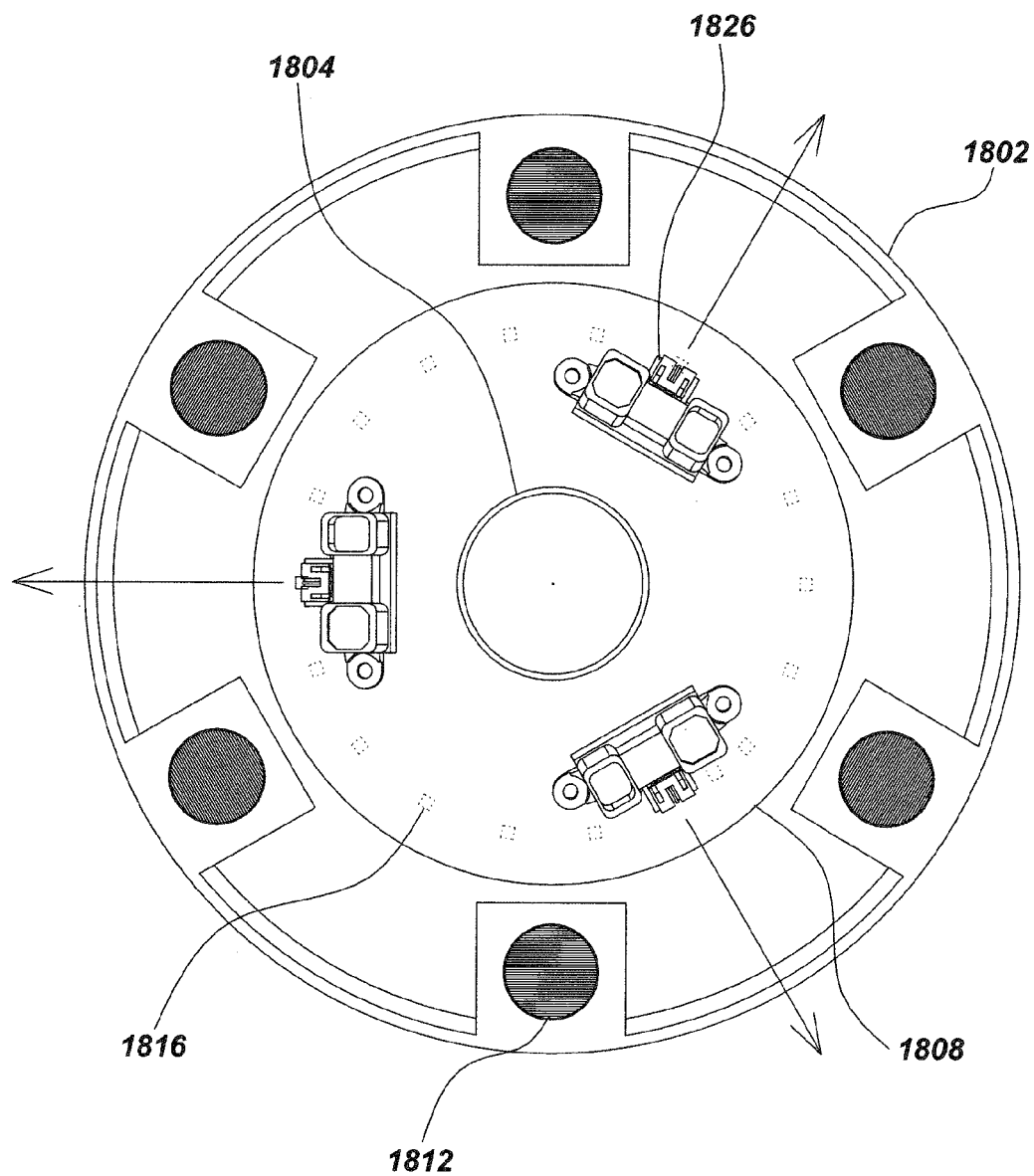
FIG. 19 is a bottom view of the ground tracking system embodiment of FIG. 18.

Referring to FIG. 19, a bottom view of the ground tracking system embodiment of FIG. 18 is illustrated. One or more distance sensors 1826 may be mounted on the underside of the circuit board 1808 and tilted outward to clear the lower antenna module 1806. One or more LED reflectors 1812 may be fitted with beam-forming lens gratings. The light sensor arrays 1816 may be mounted on the upper surface of the circuit board 1816.

In an exemplary embodiment, the outer housing may be formed with an attachment mechanism for connecting a mechanical ground-tracking component, such as a wheeled assembly connected by a yoke, for example, that could rotate around the outer housing as demanded by the travel of the operator using the locator. Measurement data produced by such an auxiliary mechanical ground-tracking unit may be included in the cross-correlations of location and used to refine the computation of instrument movement in three dimensions, including rotation.

In processing multiple sensors in a ground-tracking application, a series of calculations are made which correlate every sensor's output against the data from every other sensor at very high speed. One design for such a system may include a dedicated FPGA to maintain the necessary speed of computation. The results of such computation may be integrated with mapping software either in the locator or in a post-processing server connected by a wireless data link, or written to memory for later processing.

In another aspect, a locator may be equipped with a laser light source and a receiver/imager which captures the reflections of the light source from the ground.

Figure 20:
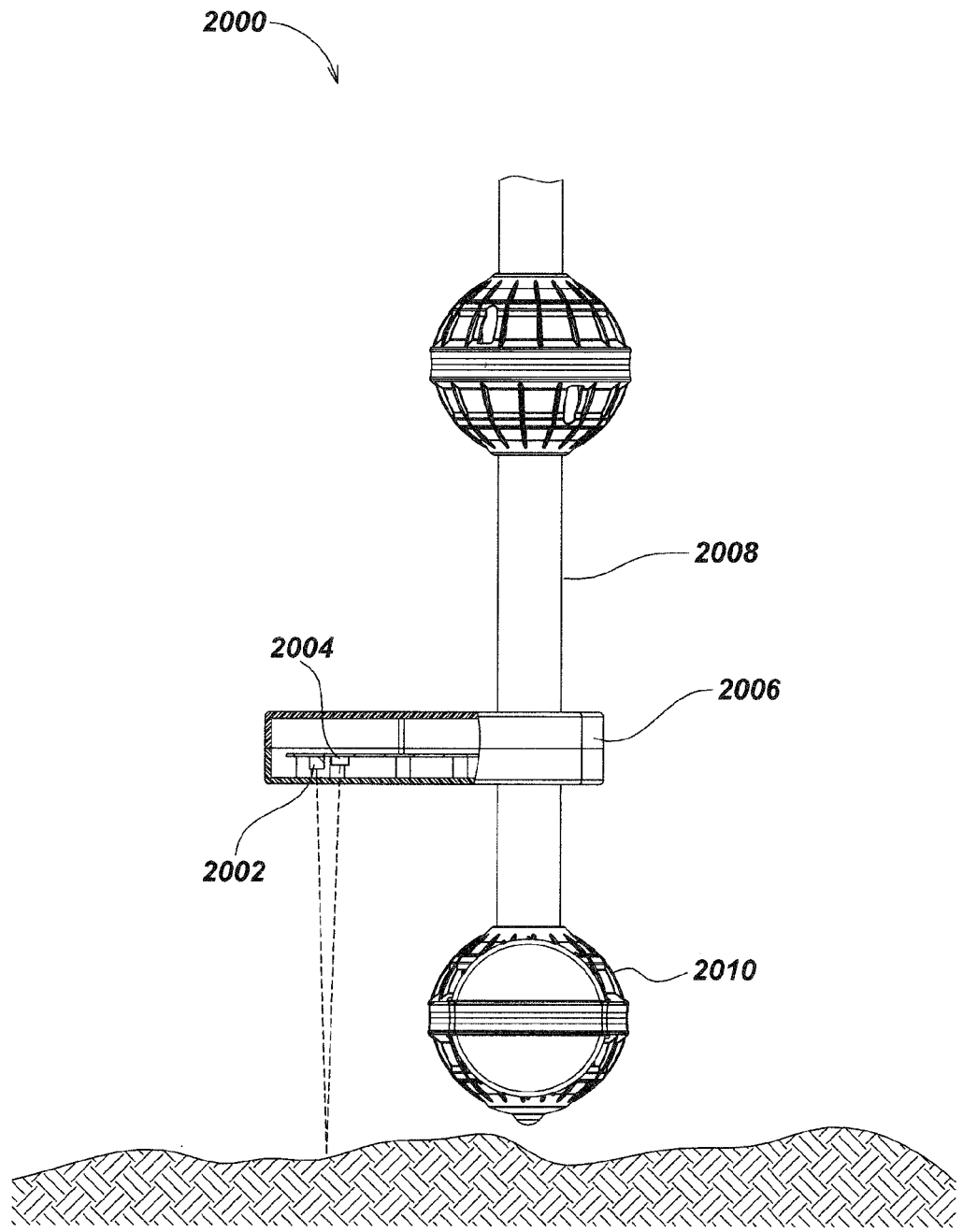
FIG. 20 is a side view of an alternative embodiment ground tracking system in which a locator instrument includes a coherent light laser and a sensor capable of detecting reflections of the laser light from a ground surface.

Turning to FIG. 20, an embodiment of a locator 2000 is illustrated in a side section view. A laser diode 2002 and an imager 2004 may be installed in casing 2006 in such a way that they are approximately coplanar and (optionally) mounted on the locator mast 2008 near the lower antenna node 2010. Imager 2004 may be of the variety used in laser mouse construction in the computer industry, such as the Avago ADNS 9500 sensor, for example. Imager 2004 may have a high frame rate of over 11,000 fps, and may track motion up to 150 inches per second. In a configuration such as shown in FIG. 20, a bandpass filter may be added to the sensor in order to optimize the detection of laser light in daylight operation. Auxiliary optics may optionally be used in front of imager 2004.

Laser speckles are the result of light constructively or destructively interfering after being scattered by a non-specular surface based on distance from the reflecting plane and motion over it the distribution, size and form of individual speckles in a captured reflection image will vary. The width and size of individual speckles are a function of the laser wavelength and the divergence of individual reflected beams, as well as the distance between the imaging plane and the reflective surface. Beam diameter will also impact the average speckle size. When the imaging plane is moving, the speckles forming the image will change in size, shape and intensity. Depending on the size of the speckles in an image, movement of the imaging plane will be exaggerated many times over the plane's actual translated distance.

Figure 21:
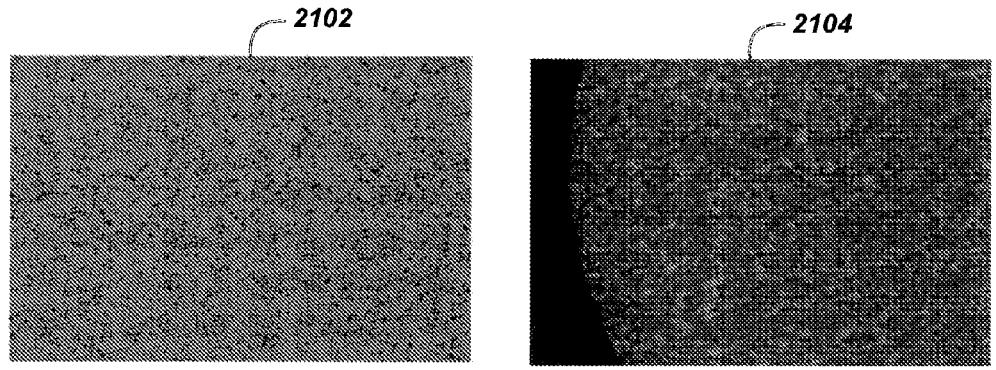
FIG. 21 illustrates a pair of laser speckle patterns as detected by the sensor of FIG. 21 from various surfaces.

Turning to FIG. 21, a pair of laser speckle patterns is illustrated. For example, the speckle pattern in frame 2102 is small, indicating the image plane was close to the illuminated surface, on the order of <10 cm. The speckle pattern in a frame 2104 are slightly larger, indicating a greater distance between the imaging plane and the illuminated surface.

Comparison of consecutive samples of speckle patterns captured by the imaging plane may provide a software-based analysis of the velocity and direction of translation of the locating device over the ground.

Figure 22:
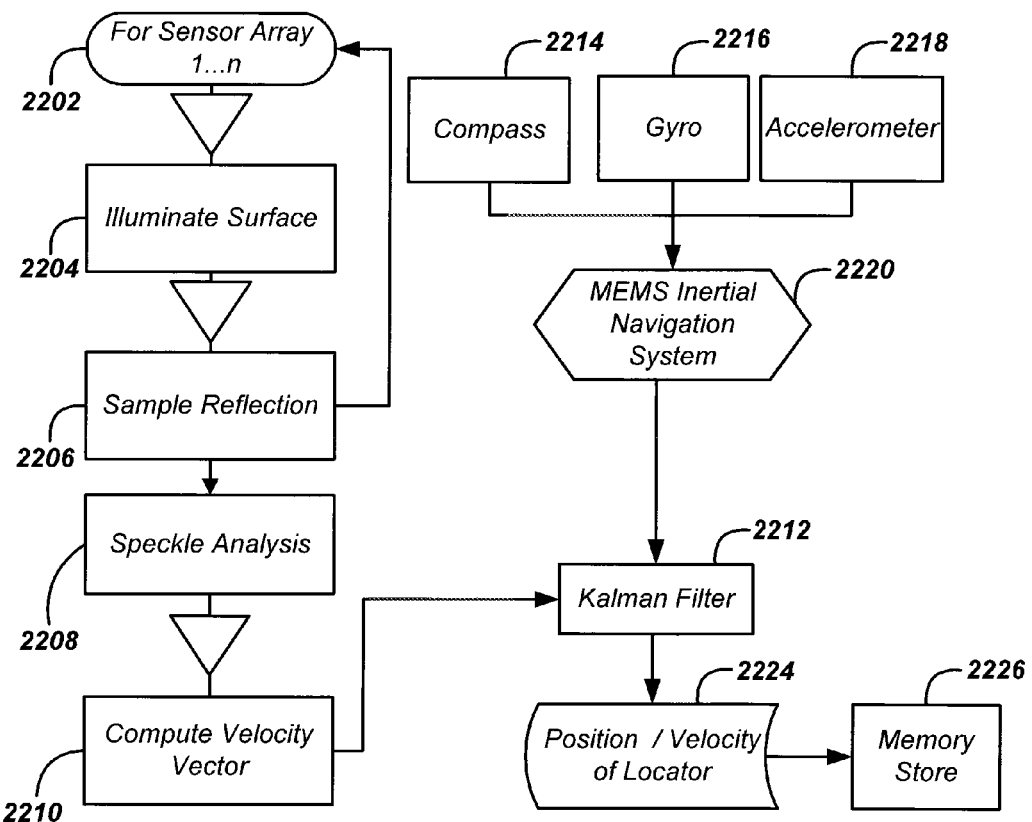
FIG. 22 is a flow chart of a process embodiment for computing direction and velocity based on laser speckle analysis.

Turning to FIG. 22, a flow chart of an embodiment of a process for computing direction and velocity based on laser speckle analysis is illustrated. A locating instrument may support multiple instances of the laser array 2002 shown in FIG. 20, and for each such array a timed pulse causes surface illumination 2204 and a sampling of the reflection 2206 at the imaging plane. Speckle analysis 2208 may yield a velocity vector 2210. Additional inputs may be provided by a MEMS navigation system 2220 which may include a digital compass 2214, a gyro sensor 2216 and/or one or more accelerometer circuits 2218. Such onboard sensor data may be integrated by one or more Kalman filters 2212 providing a higher-confidence position and velocity value 2224, which may then be stored in local memory 2226 for later reference.

In another aspect, a locator or other instrument that may benefit from ground tracking may use two or more cameras to capture images or video which may be used to record various aspects of a locate or other operation. For example, in a buried object locate operation, it may be desirable to capture an operator-perspective of the area being located, such as a series of images or a video of the area around the operation, a position where an observation is made, features in the area under observation, ground or other surface characteristics, and/or other visual information. In addition, by capturing stereo pairs and processing the images, tracking may be implemented by matching reference points on the images, such as reference points on the surface and/or projected reference points, such as laser dots or lines or other targets, such as grids, and the like. Example of generation and processing of laser-generated dots, markers, or other targets as may be provided from ground tracking apparatus are described in, for example, co-assigned U.S. patent application Ser. No. 13/754,767, filed on Jan. 30, 2013, entitled ADJUSTABLE VARIABLE RESOLUTION INSPECTION SYSTEMS AND METHODS, the content of which is incorporated by reference herein.

Distance sensors may also be used to measure distance at two points using, for example, an infrared distance sensor. An example distance sensor operates by using a linear CCD and beam and processing the light signal parallax to determine distance. Distance sensor data may be advantageously combined with image data taken with either multiple cameras, sequentially over known time intervals, or both to generate tracking data and information.

Figure 23:
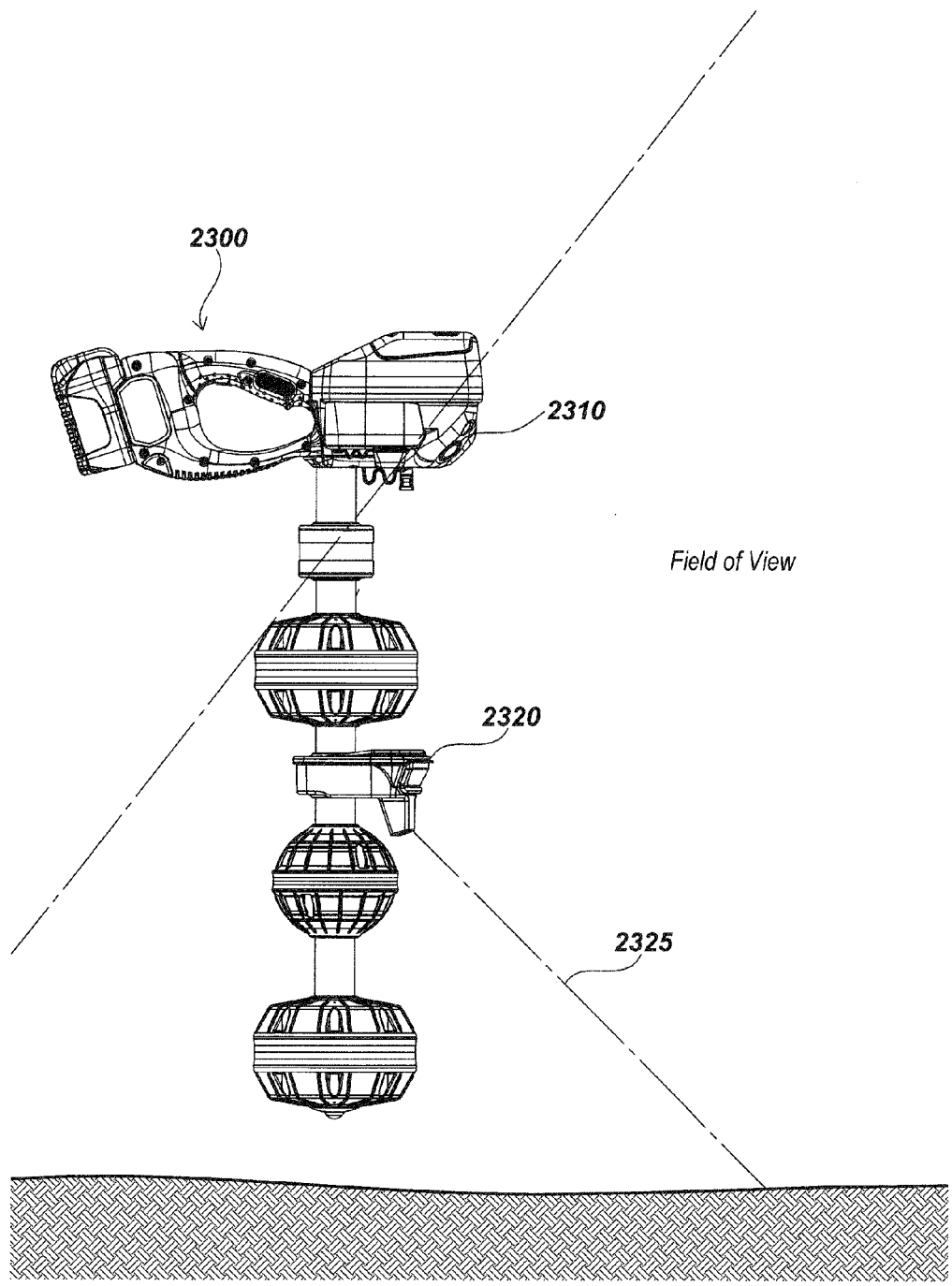
FIG. 23 is a side view of a ground tracking locator device embodiment.
Figure 24:
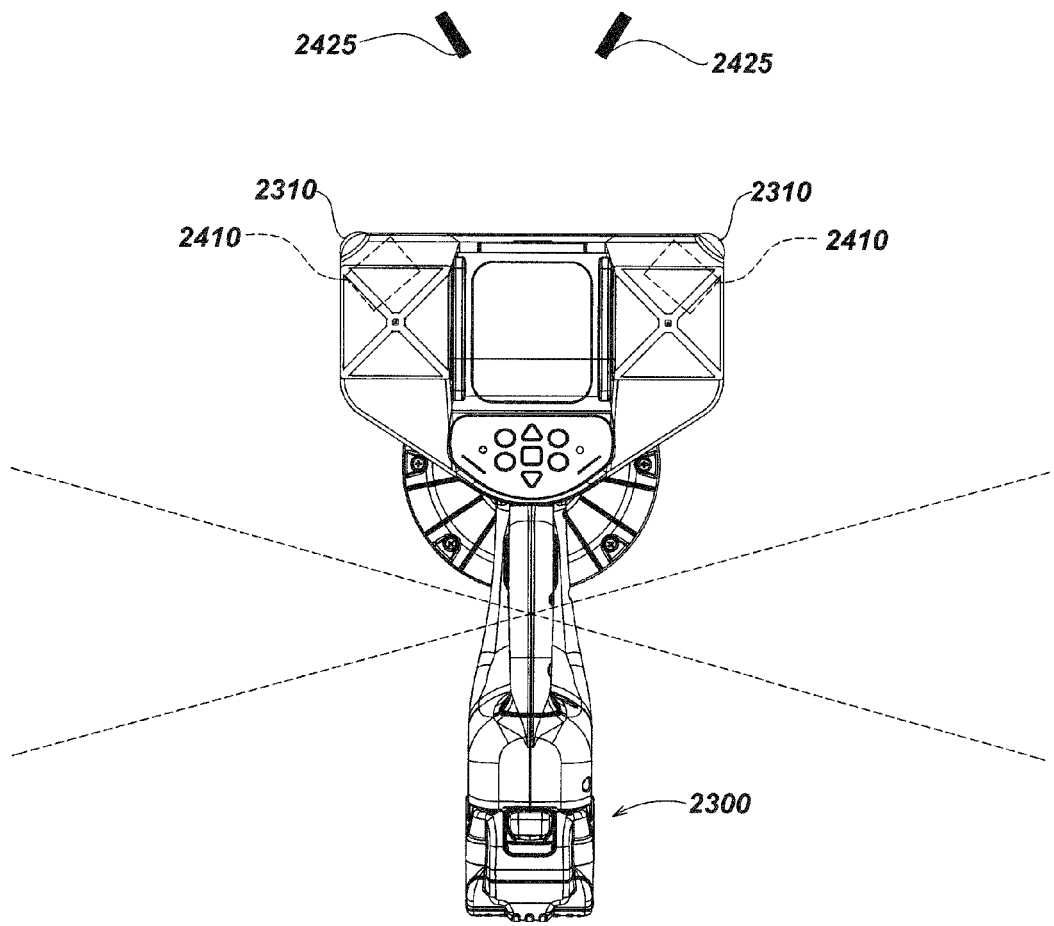
FIG. 24 is a top view of the ground tracking locator device embodiment of FIG. 23.

Turning to FIGS. 23 and 24, a ground tracking locator embodiment 2300, in accordance with certain aspects, is illustrated to show another implementation for over-ground tracking devices. The ground tracking locator 2300 may include two or more camera modules (i.e., modules including imaging devices such as CCD or CMOS devices, optics, such as wide-angle or fisheye lenses and mounting apparatus, associated electronics and signal processing circuits, and the like), such as the cameras 2310 as shown, which may be built into a forward oriented face of the locator device, such as facing outward and downward from the locator head or body, which may contain corresponding processing elements for receiving the processing images and/or video from the cameras as well as processing magnetic field signals from the locator, sensor data or information from other sensors such as accelerometers, compass sensors, GPS receivers, distance sensors, and/or other sensor devices.

Additional cameras may be included, such as side-facing cameras, upward-facing cameras, and or additional cameras on forward or downward-facing surfaces. For example, an upward facing camera may be used to capture images and/or video of the area above the locator, which may include horizon lines and/or the sun or other celestial features. A forward-facing camera may be used to capture images or video directly in front of the camera, which may be further used in determining tracking or motion information and/or capturing scene features or data.

The cameras 2310 may each include a high resolution imager coupled with a fisheye or wide angle lens providing high resolution, wide field of view image or video data of the surrounding area for navigation, mapping, and/or documentation purposes. For example, with a pair of camera elements facing forward and downward, with wide angle optics, the field of vision may include forward-facing features such as the horizon and features in front of and partially to the side of the operator, as well as downward features, such as features on the ground below the operator. In an exemplary embodiment, the camera elements may be oriented approximately 45 degrees downward from level (e.g., about half way between level and straight down when the locator is help in a normal upright orientation), and may be offset from a forward-looking orientation at an angle of approximately 30 degrees (e.g., each camera element is angled approximately 30 degrees from directly ahead, resulting in approximately 60 degrees offset from each other).

In other embodiments, separate downward and forward facing imagers/cameras may also provide a wide field of view image data of the surrounding area. Additionally, some over-ground tracking devices, such as the ground tracking locator 2300, may be optimized to record the position of paint markers or other locating indicators that have either been previously applied in the locate area as well as record the position of new indicators and paint marks as they are applied to the locate area. Though the ground tracking locator 2300 is shown with two cameras/imagers, other embodiments of an over-ground tracking device in keeping with this disclosure may function with one or more cameras/imagers. These images may be high or low resolution imagers.

Furthermore, other embodiments with over-ground tracking capabilities in keeping with the present disclosure may include an over-ground tracking device independent from a utility locator. Ground-tracking capabilities may also be built into other kinds of instruments. The use of two cameras, such as the case with the ground tracking locator embodiment 2300, may allow for stereoscopic vision and three dimension measurement of objects. The distance measurements of objects within the stereoscopic vision of the ground tracking locator 2300 may allow for an accurate velocity measurement as well as enable the ability to reconstruct the size and shape and true position of objects in the overlapping field of view. Furthermore, stereo images may also be derived from subsequent recorded frames within non-overlapping field of view areas as an over-ground tracking device such as the ground tracking locator 2300 is made to move about the area.

Some embodiments may be configured to reconstruct a geo-referenced, downward looking photo-mosaic of an area. Further information regarding similar methods and technologies for creating such a photo-mosaic may be found in co-assigned U.S. patent application Ser. No. 12/947,503, entitled IMAGE-BASED MAPPING LOCATING SYSTEM filed Nov. 16, 2010, the content of which is incorporated by reference herein. A movie type view of the area may also be created by using the upper forward, horizontal looking portion of the images recorded.

In addition to the cameras 2310, the ground tracking locator 2300 may also be equipped with one or more distance sensors 2320. The distance sensors 2320 may be, for example, GP2Y0A02YKF sensor units available from SHARP Microelectronics of Camas, Wash. Information from the distance sensors may be used in combination with known camera optics and images captured from the camera to match features on the ground at a known distance (based on distance sensor information) to determine movement of the locator, which may be done in a processing element of the locator. For example, if a feature at a known distance is captured in multiple images or video frames taken at a known rate, and the corresponding distance information is collected, the pixels of the image can be associated with the distance data and processed to determine motion and speed information.

Furthermore, an over-ground tracking device such as the ground tracking locator 2300 may include an inertial navigation sensors (INS) and/or global positioning systems (GPS) and/or other sensors and systems for determining position, movements, and orientation of the device. Light Detection and Ranging (LIDAR) or other laser scanning type systems may also be included embodiments of over-ground tracking devices to generate a three dimensional point cloud of objects in the environment.

As shown in FIG. 24, along each side and near the front oriented face of the ground tracking locator 2300 a protrusion may be formed. Each of these protrusions may, for instance, house a GPS antenna 2410 as well as one of the cameras 2310. Additional details of embodiments of suitable GPS antenna technologies and systems may be found in co-assigned U.S. Provisional Patent Application Ser. No. 61/618,746, filed Mar. 31, 2012 entitled DUAL ANTENNA SYSTEMS WITH VARIABLE POLARIZATION, which is incorporated by reference herein.

Spaced apart GPS antennas and associated GPS receiver modules (not shown), such as the GPS antenna 2410, may be used to provide a GPS compass baseline allowing heading measurements to be made. Such antennas may also be configured to receive signals from other positioning systems such as, but not limited to, GLONASS or Galileo global navigation satellite systems. By mounting the cameras 2310 into the protrusions, extra width may be provided to the ground tracking locator 2300, thereby increasing the distance between the two cameras 2310. The increased distance between the two cameras 2310 may provide an increased stereo base line and improved depth perception for the ground tracking locator embodiment 2300.

In an exemplary embodiment, the distance sensors 2320 may each emit an infrared or other similar beam such as the illustrated distance sensor beam 2325. The distance sensor beam 2325 may project a distance indicator mark 2425 onto the ground surface where sensor beam 2325 intersects with the ground. In some embodiments, the distance indicator mark 2425 may be viewable via the cameras 2310. In other embodiments, the location of the distance indicator marks 2425 may be estimated via sensor data and the known and fixed distance and/or orientation from the cameras 2310 and the distance sensors 2320. This information may be used in conjunction with captured images and data mapping the camera optics to determine motion based on known image capture times and movement of the pixels matched to the distance sensor data. This information may be determined in a processing element of the locator or separate processing element of the ground tracking apparatus.

Figure 25:
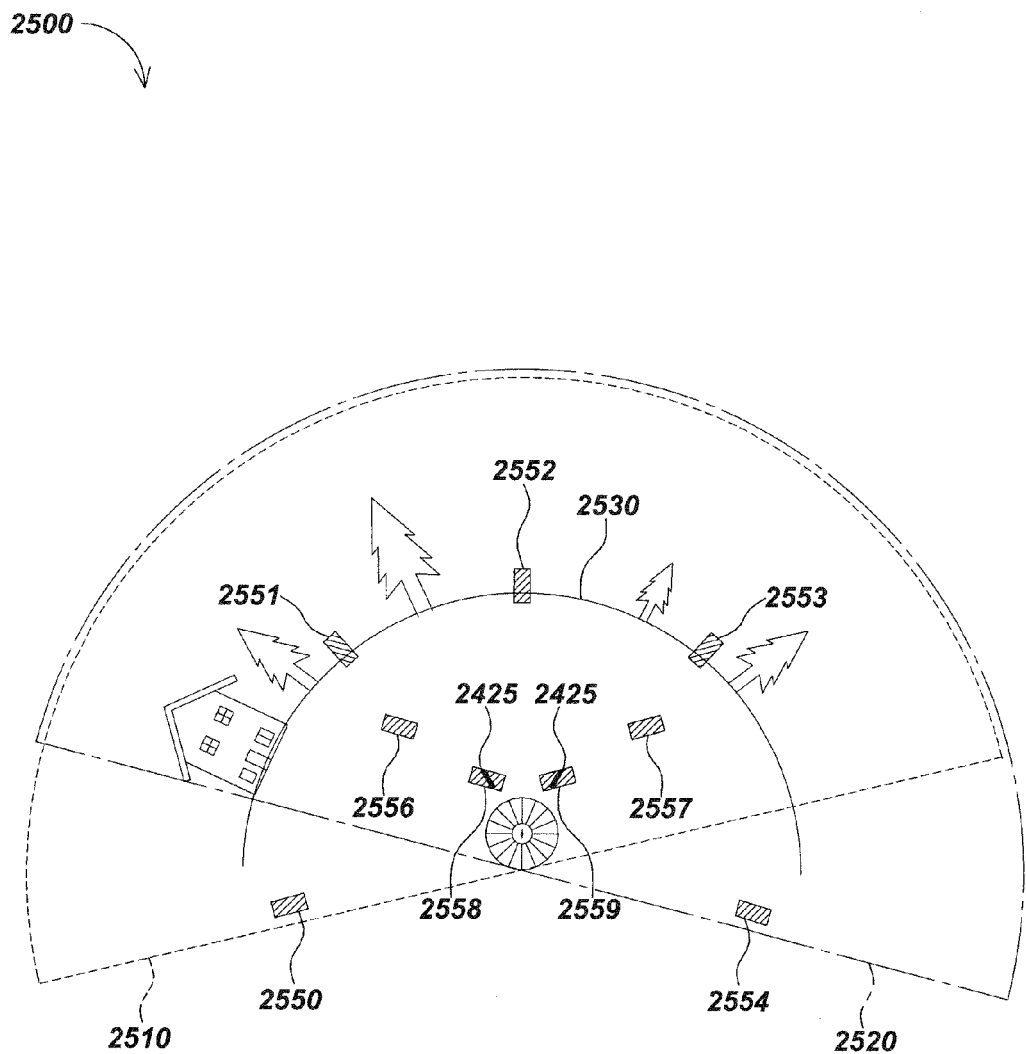
FIG. 25 is an illustration of a typical view of the device from FIG. 23.

Turning to FIG. 25, an illustration of a typical view 2500 of the cameras 2310 (FIG. 24) of one embodiment is presented. In such a view, a left camera view 2510 and a right camera view 2520 from the corresponding ones of the cameras 2310 may be indicated by the dotted lines with an overlapping central section. A wide field of view may be provided by the cameras 2310 (FIG. 24) so as to include the distance indicator mark 2425 locations, the horizon 2530, as well as the surrounding area. Optical sampling areas, such as the sampling areas 2550-2559 may be found in various locations throughout the field of view of the two cameras 2310 (FIG. 24) to determine specific movements of the ground tracking device 2300.

Some optical sampling areas may be used to determine particular movements of the ground tracking locator 2300. For instance, sampling areas 2550-2554 may be used to determine rotational movements of the ground tracking locator 2300 whereas sampling areas 2558-2559 may be used to calculate lateral movements. Other optical sampling area, such as sampling areas 2556-2557, may be used to calculate both lateral and rotational movements. Within each of the sampling areas 2550-2559, optical flow of pixels between each successive video and/or image frame may be used to calculate the velocity and direction of the ground tracking device 2300 as the velocity and direction of the optical flow will be proportional to the velocity and direction of the ground tracking device 2300. Furthermore, in optical sampling areas existing in the overlapping areas of view from the two cameras 2310 (FIG. 24), a measurement along the vertical axis may also be made. Various optical flow rate algorithms such as, but not limited to, block search algorithms, the Lucas-Kanade method, and the Horn-Schunck method may be used to determine the optical flow.

Figure 26:
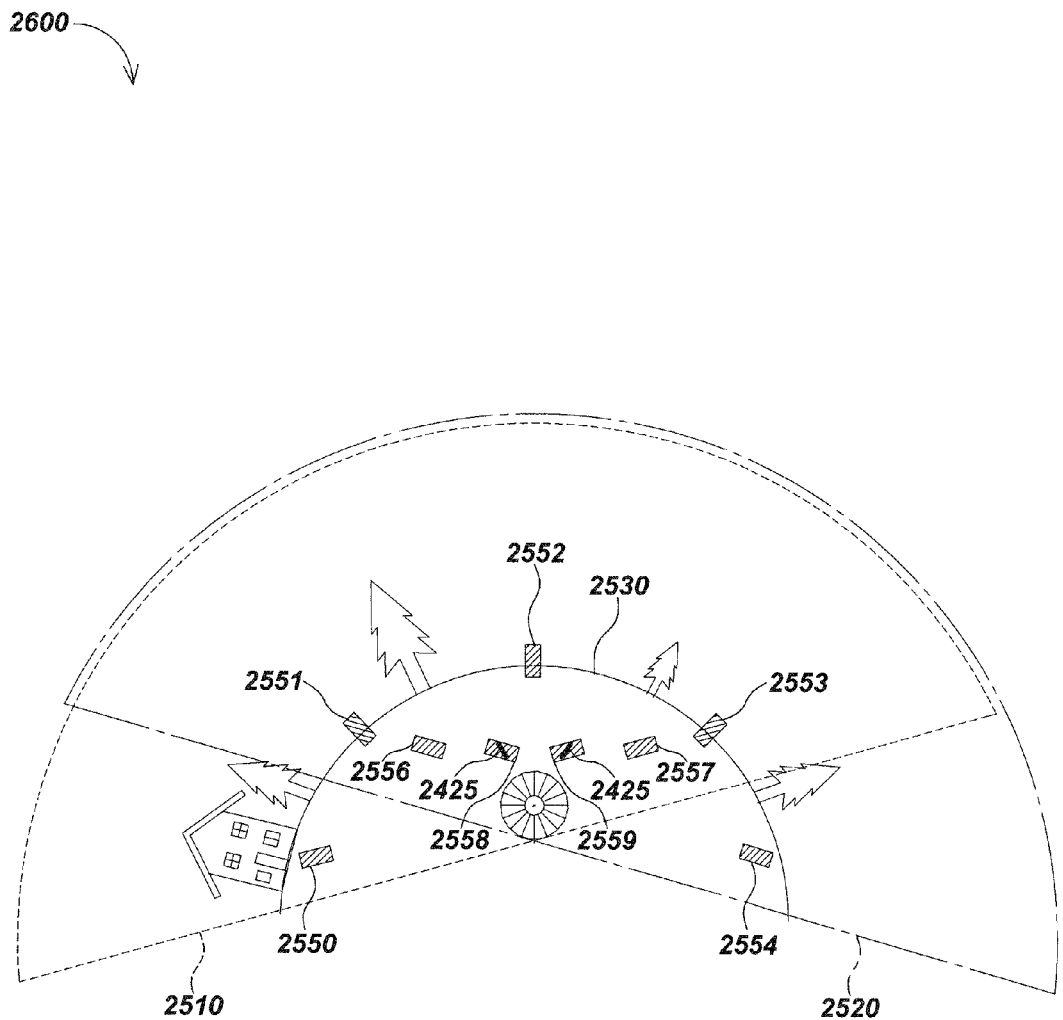
FIG. 26 is a tilted view of FIG. 25.

In determining lateral movements of an over-ground tracking device such as the ground tracking locator 2300, a calibration may first be made where the ground tracking locator may be moved in various lateral directions. In some embodiments, measurements from inertial navigation sensors and/or optical tracking of the horizon may be used to determine yaw, pitch, and roll rotation type movements of the ground tracking locator 2300. In embodiments where both horizon tracking and inertial navigation sensor measurements may be used to determine rotational type movement, a Kalman filter may be used to combine both sets of data. As illustrated in FIG. 26, the optical sampling areas may be made to dynamically shift with movements such as tilting of the ground tracking locator 2300. For instance, the tilted view 2600 may have sampling areas 2650-2659 that correspond to the sampling areas 2550-2559 of the view 2500 of FIG. 25. As shown in FIG. 26, the sampling areas along the horizon 2630, which may correspond to the horizon 2530 of FIG. 25, may shift to remain tracking along the horizon 2630 while others of the optical sampling areas may be made to shift and track other features.

In yet other embodiments, the entire area of each image may also be processed and motion vectors derived.

Corrective methods may be used in instances where optical flow may be difficult to correctly ascertain due to the presence of, for instance, tall grass, shadows, curbs, or other problematic phenomena or objects appearing within the optical sampling area. One method may be to determine the minima of the sum of absolute differences metric in an exhaustive search. If a problematic object is determined to be in the sampling area, multiple deep minima will be evident. Each minima may correspond to a velocity. A voting scheme, probability, or a Kalman filter may be used to determine the correct velocity. Another method may be to examine velocities calculated from different sampling areas. A histogram may be generated from the velocities and the outliers may be removed. Again, a voting scheme, probability, Kalman filter, or other techniques known or developed in the art may be used to determine the correct velocity. For example, other methods, such as bundle adjustment, may also be used to make these adjustments.

Figure 27:
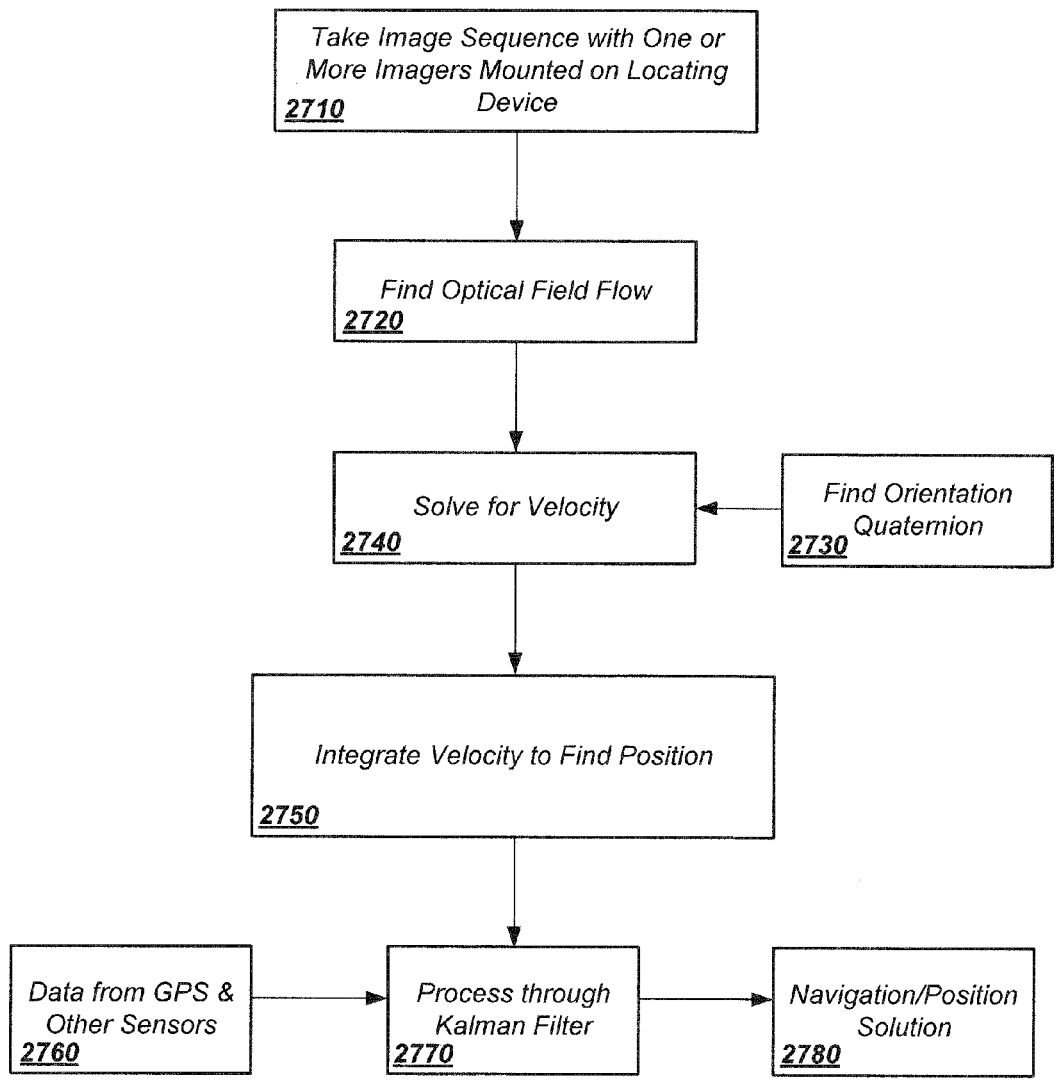
FIG. 27 is a block illustrating an embodiment of a process for ground tracking using the locating device embodiment of FIG. 23.

In FIG. 27, a block diagram is providing illustrating an embodiment of a method for determining the movement of an over-ground tracking device such as the ground tracking locator 2300. In a first stage 2710, video or sequential images are recorded with the imagers on an enabled locating device. In a second stage 2720, the optical field flow is determined. In a separate stage 2730, the orientation quaternion is found. From stages 2720 and 2730, the velocity of the locating device may be found. In a stage 2750, the determined velocity is integrated to find position of the locating device. In a separate stage 2760, data from GPS, inertial navigation sensors, and other sensors is determined. In a combined stage 2770, data from stages 2750 and 2760 are processed through a Kalman filter. In a final stage 2780, a navigation and position solution for the locating device is determined.

Figure 28:
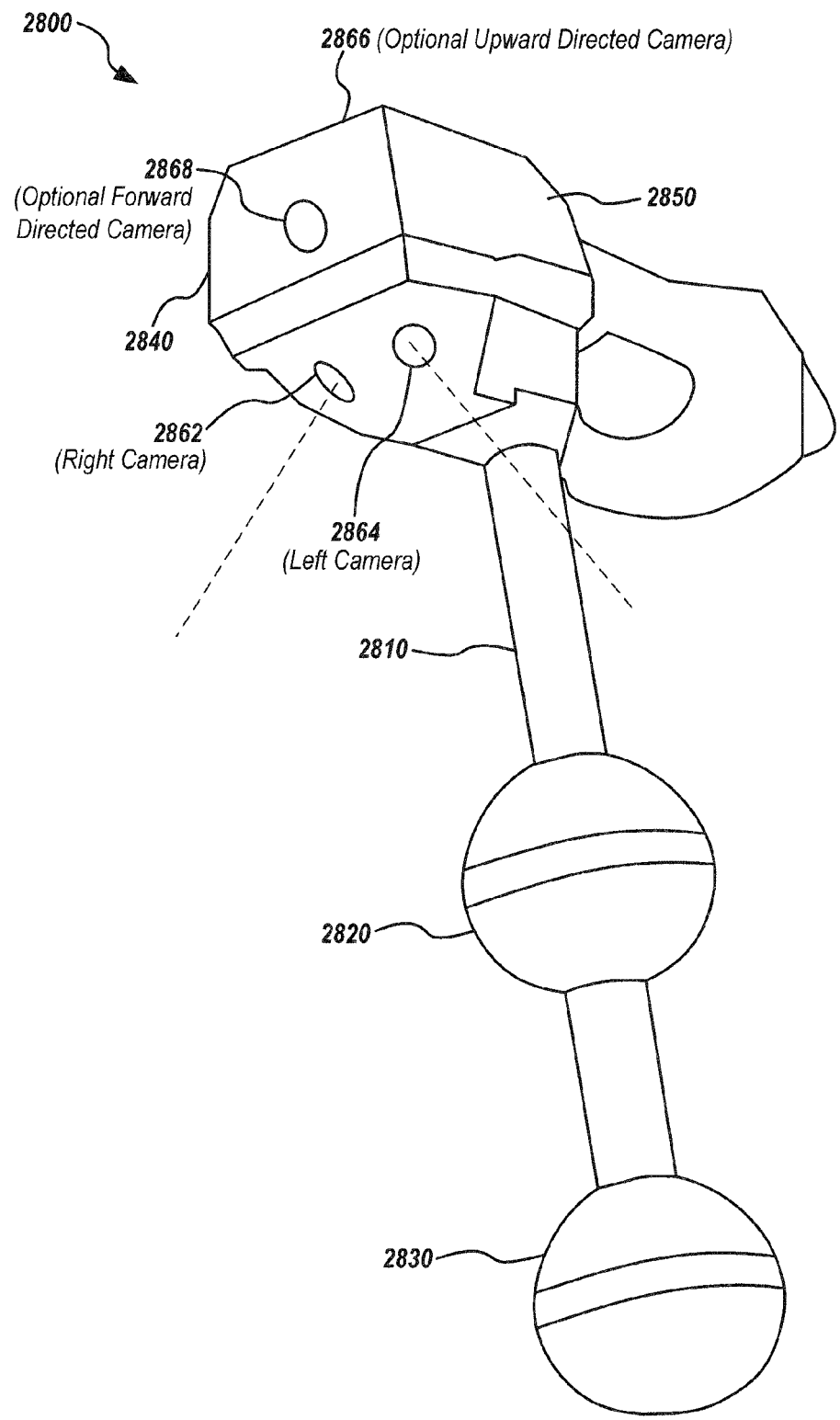
FIG. 28 illustrates details of an embodiment of a locator with an integral ground tracking apparatus using multiple cameras oriented in a downward and outward facing configuration.

FIG. 28 illustrates details of another embodiment 2800 of a buried object locator with an optical ground tracking system using multiple cameras to image details of an area being located and provide multiple images or video streams for processing in a processing element to generate tracking information and/or images or video. The captured and generate information may include, for example, a captured operator point of view (e.g., in the form of image sequences or videos to provide a "movie" of what the operator sees in the area being located); implementing ground tracking by processing images from multiple cameras and distance sensors to generate motion information; generating stitched or photomosaic-type images covering very wide fields of view (e.g., 180 degrees or view of more based on images from multiple cameras); stereo imaging, where stereo pairs or stereo video streams are captured and used to generate models of the area being observed and/or adjacent features; images of ground features or paint marks either on the ground or placed there during locate operations; overhead images or video, such as images or video streams capturing upward-viewed scenes, such as the sky, horizon, solar or celestial features, and the like; as well as other signal processing functions described herein and/or in the incorporated or priority applications.

In addition, images or video collected from the multiple cameras can be used in either real time or post-processing to be combined with aerial photography (e.g., images or video from Google Earth or other aerial or ground imagery), map data, such as reference maps as provided by USGS, Mapquest, Google, or other mapping sources. Further collected data and information may be further post-processed to provide more accurate information. For example, collected GPS data may be post-processed using techniques known or developed in the art to improve accuracy. In addition inertial data collected during locate operations, such as from compass sensors, accelerometers, inertial sensors, and the like can be post-processed to improve accuracy over that available during real time in the field processing (based on current processing capabilities—as processing abilities improve, these functions can be migrated to the actual locator devices in future embodiments).

Returning to FIG. 28, locator embodiment 2800 may include one or more magnetic field antennas, such as antennas 2820 and 2830, which may be magnetic field antennas as described in the incorporated applications or other magnetic field antennas as are known or developed in the art. The antennas may be mounted on a mast 2810, which may be coupled to a locator body which may include a head or housing 2840 to enclose electronics, processing elements, other signal processing and control circuits, displays, and the like (not shown in FIG. 28). The housing may include a handle for an operator to grip the locator and move it around the area being located.

One or more displays and user interface elements (not shown in FIG. 28) may be mounted on the top of the housing 2840, such as switches, a control joystick or mouse device, such as those described in co-assigned patent applications, for example, U.S. patent application Ser. No. 13/110,910, entitled USER INTERFACE DEVICES, APPARATUS, AND METHODS, filed May 18, 2011, U.S. patent application Ser. No. 13/214,209, entitled MAGNETIC SENSING USER INTERFACE DEVICE METHODS AND APPARATUS, filed Aug. 21, 2011, U.S. patent application Ser. No. 13/272,172, entitled MAGNETIC THUMBSTICK USER INTERFACE DEVICES, filed Oct. 12, 2011, U.S. patent application Ser. No. 13/292,038 entitled SLIM PROFILE MAGNETIC USER INTERFACE DEVICES, filed Nov. 8, 2011, and U.S. patent application Ser. No. 13/310,670, entitled MAGNETICALLY SENSED USER INTERFACE APPARATUS AND DEVICES, filed Dec. 2, 2011, which are incorporated by reference herein.

Figure 29:
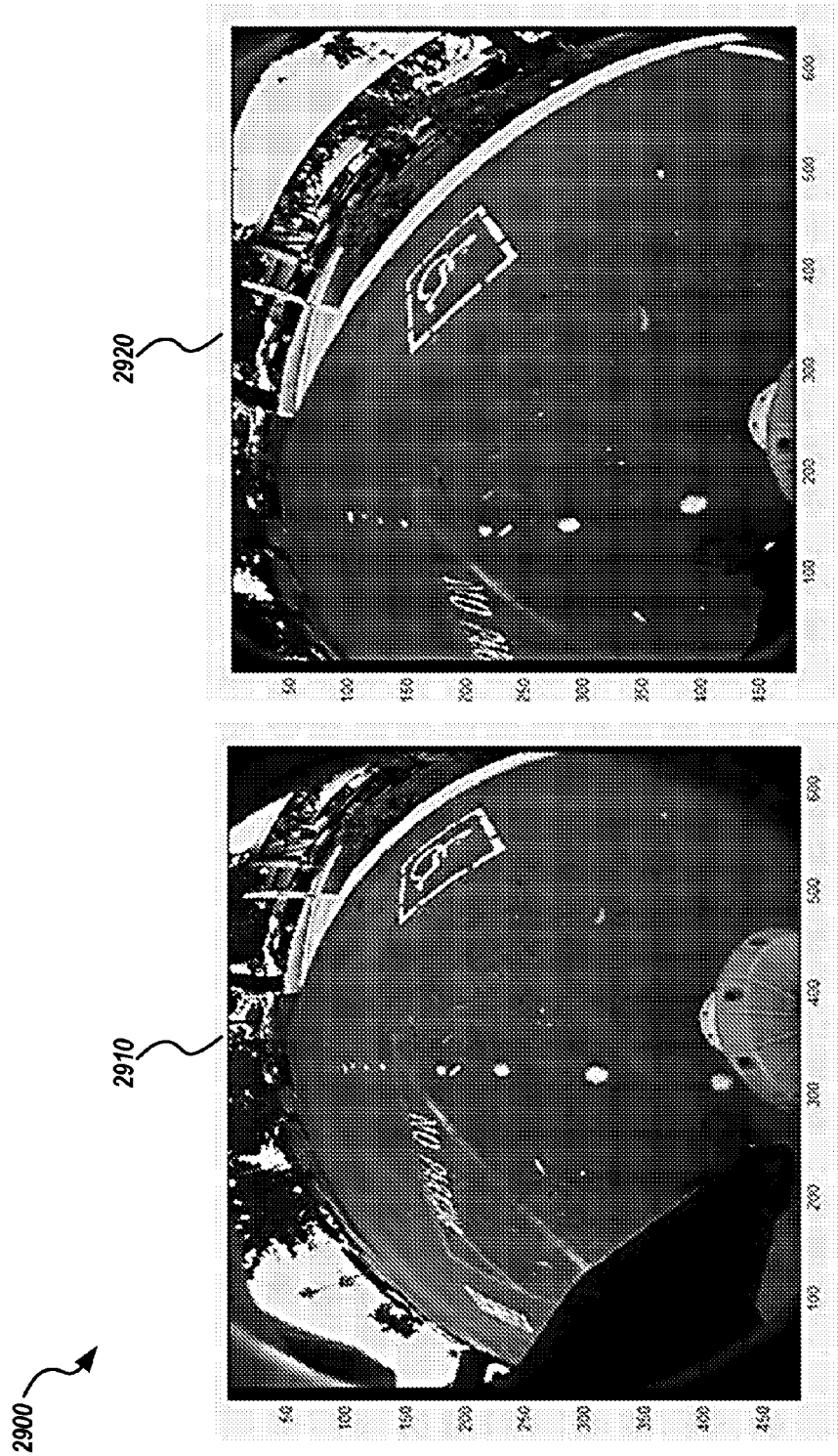
FIG. 29 illustrates example image pairs from the locator of FIG. 28 illustrating wide angle fields of view of a stereo pair generated by one embodiment.

Two forward and downward facing cameras, cameras 2862 and 2864, may be included to capture both forward and downward-looking images or video. These cameras may have wide angle optics to capture both forward and downward-looking images, such as are shown in FIG. 29. Additional cameras may optionally be included, such as an upward-oriented camera 2866 (not shown in FIG. 28 but located by pointer), a forward-facing camera 2868, and/or other cameras (not shown). Additional elements, such as distance sensors, inertial navigation sensors, GPS antennas and receiver modules, processing elements, and the like (not shown) may be included and implemented such as described previously herein.

FIG. 29 illustrates details of an example image pair (or frames of a stereoscopic video stream) as may be captured by a ground tracking apparatus of a locator such as shown in FIG. 28. The left camera image 2910 includes areas of the scene being viewed by the locator operator both forward-looking, including the horizon, as well as directly downward looking, including the operator's feet and the antennas of the locator. Additional information to the side of the operator on the left is also visible in the left camera image. The right camera image 2920 shown similar information, with additional details of the scene to the operator's right side. If markers, such as laser dots or other targets, are projected on the area being located, and corresponding distance information is determined between and/or across frames during motion, tracking information can be determined in a processing element of the locator, such as described previously herein.

In addition to the ground tracking embodiments described above, in some embodiments, ground tracking elements and functions as described in the various priority applications and/or incorporated applications may be combined, in whole or in part, with the disclosures herein to implement alternate ground tracking apparatus and/or locators or other devices with integral ground tracking functionality.

In some configurations, the apparatus, circuit, modules, or systems described herein may include means for implementing features or providing functions described herein. In one aspect, the aforementioned means may be a processing element or module including a processor or processors, associated memory and/or other electronics in which embodiments of the invention reside, such as to implement signal processing, switching, transmission, or other functions to process and/or condition transmitter outputs, locator inputs, and/or provide other electronic functions described herein. These may be, for example, modules or apparatus residing in buried object transmitters, locators, coupling apparatus, and/or other related equipment or devices.

In one or more exemplary embodiments, the electronic functions, methods and processes described herein and associated with ground tracking apparatus and locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise. The various steps or stages of processes or methods disclosed herein may be implemented in one or more processing modules or elements as described herein, which may be located in a buried object locator or other test or measurement device, or in a ground tracking apparatus, or in a combination of both devices or shared by both devices.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element or module with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the following Claims and their equivalents.

We claim:

1. A method of tracking movement of a buried utility locator over a surface, comprising:
   determining in the buried utility locator, based on received magnetic field signals emitted from a buried utility below the surface, an estimated depth of the buried utility;
   generating an output light;
   providing the output light to the surface;

receiving a portion of the output light that is reflected from the surface at one or more color light sensors;

generating, in a processing element, information associated with a user-applied movement of the locator over the surface, including speed and/or direction information relative to a previous position of the buried utility locator, based at least in part on output signals from the one or more color light sensors and corresponding to the received reflected portion of the output light;

associating the information associated with a user-applied movement with the estimated depth of the buried utility; and storing the information associated with a user-applied movement of the locator and the estimated depth of the buried utility in a memory of the locator.

2. The method of claim 1, wherein the light sensor comprises one or more color light sensors.

3. The method of claim 1, wherein the information associated with the user-applied movement of the locator includes motion speed and/or direction information.

4. The method of claim 1, wherein the information associated with the user-applied movement of the locator includes offset position information relative to a previous position of the locator.

5. The method of claim 1, wherein the information associated with the user-applied movement is generated in the processing element based further in part on an output distance signal provided from a ground distance sensor.

6. The method of claim 1, wherein the buried utility information includes an estimated depth of the buried utility.

7. The method of claim 1, wherein the buried utility information includes ground surface coordinates of the buried utility.

8. The method of claim 1, wherein the buried utility information includes directional information associated with the buried utility.

9. The method of claim 1, wherein the information associated with the user-applied movement is generated in the processing element based further in part on an output of an accelerometer in the locator.

10. The method of claim 1, wherein the information associated with the user-applied movement is generated in the processing element based further in part on an output of a compass-sensor in the locator.

11. The method of claim 1, wherein the information associated with the user-applied movement is generated in the processing element based further in part on an output of a gyroscopic sensor.

12. The method of claim 1, wherein the information associated with the user-applied movement is generated in the processing element based further in part on outputs of an accelerometer, a compass sensor, and a gyroscopic sensor in the locator.

13. The method of claim 12, wherein the information associated with the user-applied movement is generated in a Kalman filter implemented in the processing element using the outputs of the accelerometer, the compass sensor, and the gyroscopic sensor as inputs to the Kalman filter.

14. The method of claim 1, wherein the information associated with the user-applied movement is used at least in part to generate a map of the area over which the locator is being moved on a display of the locator.

15. The method of claim 1, wherein the buried utility information is overlaid on the map.

16. The method of claim 1, further including generating a line-scan image of the area of the ground over which the locator is moved, and storing the line-scan image in a memory of the locator.

17. The method of claim 1, wherein the output light is generated from a laser light source, the light sensor is an imager, and the generating information associated with the user-applied movement includes processing laser light speckle patterns generated from the output light on the surface at different times so as to determine information corresponding with the user-applied movement.

18. The method of claim 1, wherein the information associated with the user-applied movement is generated in the processing element based further in part on an output of an accelerometer in the locator and/or on an output of a compass-sensor in the locator using a Kalman filter with one or more of the outputs of the accelerometer and the compass sensor provided as inputs to the Kalman filter.

19. The method of claim 18, wherein the information associated with the user-applied movement is used at least in part to generate a map of the area over which the locator is being moved on a display of the locator.

20. The method of claim 18, wherein the output light is generated from a laser light source, the light sensor is an imager, and the generating information associated with the user-applied movement includes processing laser light speckle patterns generated from the output light on the surface at different times so as to determine information corresponding with the user-applied movement.

21. The method of claim 1, wherein the surface is one of pavement, grass, or dirt ground surfaces.

* * * * *